United States Patent [19]

Roberts et al.

[11] Patent Number: 5,432,245
[45] Date of Patent: Jul. 11, 1995

[54] METHOD OF COATING THERMOREVERSIBLE HEAT-THICKENING POLYACRYLAMIDES

[75] Inventors: Michael R. Roberts, Rochester; Glenn T. Pearce, Fairport; Elizabeth V. Patton, Pittsford, all of N.Y.

[73] Assignee: Eastman Kodak Company, Rochester, N.Y.

[21] Appl. No.: 59,039

[22] Filed: May 7, 1993

Related U.S. Application Data

[63] Continuation of Ser. No. 742,784, Aug. 8, 1991, abandoned, which is a continuation-in-part of Ser. No. 502,726, Apr. 2, 1990, abandoned.

[51] Int. Cl.⁶ .................. B05D 3/02; C08F 220/54
[52] U.S. Cl. .................. 427/385.5; 430/496; 430/510; 526/72; 526/287; 526/292.2; 526/304; 526/307; 526/307.2
[58] Field of Search .............. 526/240, 248, 277, 286, 526/287, 289, 292.2, 292.95, 307, 307.2, 304, 305; 430/496, 510, 514; 427/385.5, 372.2

[56] References Cited

U.S. PATENT DOCUMENTS

| | | |
|---|---|---|
| 2,486,192 | 10/1949 | Minsk et al. |
| 2,506,537 | 5/1950 | Barnes et al. |
| 2,522,771 | 9/1950 | Barnes et al. |
| 2,533,166 | 12/1950 | Jones et al. |
| 2,555,646 | 0/1951 | Jones |
| 2,571,706 | 10/1951 | Sargent |
| 2,576,850 | 11/1951 | Murray |
| 2,811,494 | 10/1957 | Smith et al. |
| 2,968,558 | 1/1961 | Clavier et al. |
| 2,980,634 | 4/1961 | Melamed ............... 526/310 |
| 2,980,657 | 4/1961 | Melamed |
| 3,014,896 | 12/1961 | Colwell et al. |
| 3,040,012 | 6/1992 | Maeder ............... 526/89 |
| 3,269,969 | 8/1966 | Fikentscher et al. |
| 3,347,192 | 8/1968 | Grosser ............... 526/264 |
| 3,396,030 | 8/1968 | Haas |
| 3,455,686 | 7/1969 | Farney et al. |
| 3,476,186 | 11/1969 | Sarem |
| 3,509,113 | 4/1970 | Monagle ............... 526/264 |
| 3,519,590 | 7/1970 | Henry et al. |
| 3,666,810 | 5/1972 | Hoke |
| 3,790,538 | 2/1974 | Schon |
| 3,852,073 | 12/1974 | Fitzgerald |
| 3,879,205 | 4/1975 | Fitzgerald |
| 3,891,607 | 6/1975 | Kuhn et al. |
| 3,900,069 | 8/1975 | Sarem |
| 3,965,063 | 6/1976 | Holcombe, Jr. |
| 4,154,910 | 5/1979 | Tanaka et al. |
| 4,171,418 | 10/1979 | Barua |
| 4,366,194 | 12/1982 | Pilny ............... 427/385.5 |
| 4,683,258 | 7/1987 | Itoh et al. |
| 4,696,962 | 9/1987 | Danner et al. |
| 4,705,703 | 11/1987 | Meier |
| 4,710,456 | 12/1987 | Naoi et al. |
| 4,730,028 | 3/1988 | Bock |
| 4,732,930 | 3/1988 | Tanaka et al. |
| 4,857,621 | 8/1989 | Ball |
| 4,906,716 | 3/1990 | Yang |
| 4,981,936 | 1/1991 | Good, Jr. |

FOREIGN PATENT DOCUMENTS

| | | |
|---|---|---|
| 0121141 | 10/1984 | European Pat. Off. |
| 2553126 | 8/1976 | Germany |
| 61-151527 | 7/1986 | Japan |
| 277414 | 12/1987 | Japan |

OTHER PUBLICATIONS

Tetsuya Tanigami et al., Macromolecules, vol. 22 (1989) pp. 1397–1401.

J. G. Westra, Macromolecules, vol. 22 (1989) pp. 367–370.

Allene Jeanes et al. Journal of Applied Polymer Science vol. V, Issue No. 17, pp. 519–526.

Katayama et al. Macromolecules. 17. (1984). pp. 2641–2643.

(List continued on next page.)

*Primary Examiner*—Christopher Henderson
*Attorney, Agent, or Firm*—Paul A. Leipold

[57] ABSTRACT

The invention provides acrylamide polymers that, when mixed with water solvent, provide thermoreversible solutions that form low viscosity melts at temperatures separated by a third region of maximum viscosity.

12 Claims, 12 Drawing Sheets

OTHER PUBLICATIONS

Irving R. Schmolka, Journal of the American Oil Chemists Society vol. 54, pp. 110–116.

Jorgen Rassing et al. Journal of Molecular Liquids. 27 (1984) pp. 165–178.

C. L. McCormick et al. Journal of Polymer Science, vol. 22, (1964), pp. 3633–3647.

C. L. McCormick et al, Makromol Chemistry, (1987) pp. 357–370.

John H. Priest et al. Reversible Polymeric Gels and Related Systems Chapter 18 (1987).

Howard C. Haas et al, Journal of Polymer Science:Part A-1, Vol. 9, (1971), pp. 959–973.

Lloyd D. Taylor et al, Journal of Polymer Science, vol. 13 (1975) p. 2551.

Toyoichi Tanaka et al, Physical Review Letters, vol. 45, No. 20, (1980), pp. 1636–1639).

Howard C. Haas et al. Journal of Polymer Science:Part A-1, vol. 8, (1970), pp. 1725–1730.

Howard C. Haas et al. Journal of Polymer Science:Part A-1, vol. 8, (1970), pp. 3405–3415.

Charles K. Chiklis et al, Journal of Polymer Science:-Part A-2, vol. 8, (1970), pp.1 1617–1626.

Joesph S. Yudelson et al. Journal of Polymer Science:-Part A vol. 2, (1964), pp. 4683–4696.

Howard C. Haas et al. Journal of Polymer Science:Part A-2 vol. 5, (1967), pp. 915–927.

Howard C. Haas et al, Polymer Letters, vol. 2, (1964) pp. 1095–1096.

Research Disclosure No. 23406, Oct, 1983, pp. 311–312.

METHOD OF COATING THERMOREVERSIBLE HEAT-THICKENING POLYACRYLAMIDES

CROSS-REFERENCE TO RELATED APPLICATION

This is a Continuation of application Ser. No. 742,784 filed Aug. 8, 1991, now abandoned, which is a continuation-in-part of our earlier filed application U.S. Ser. No. 502,726, filed on Apr. 2, 1990 now abandoned.

FIELD OF THE INVENTION

This invention relates to polymer compositions that, in water, reversibly gel or thicken in the temperature range of about 0°–100° C. In particular, the invention relates to polyacrylamides.

PRIOR ART

There exist today many examples of polymers derived from natural, as well as synthetic sources, that exhibit thermoreversible gelation. By this term we mean a temperature-induced change in the viscous flow properties of a polymer in a solvent which results in the reversible formation of a rigid solution, or gel. The most notable of the naturally derived polymers having this property is gelatin which has been used as a protective colloid for light sensitive silver halides and other components of photographic films. Aqueous solutions of gelatin when cooled below about 38° C. will form clear rigid gels (chill-set) that melt reversibly upon heating. FIG. 1 shows this behavior viscosity plotted against temperature (°C.) for a 3% gelatin in water solution.

A limiting property of gelatin in the photographic industry is its relative insolubility in common organic solvents (e.g., acetone, methanol, ethanol). This restricts the components that film builders can use in photographic products. Another limiting property is the narrow temperature range in which gelatin forms a gel in water (0°–38° C.). Successful photographic film-making currently requires cooling the gelatin coating layers in order to retain their integrity while water and other volatile materials are removed in the drying stages. This increases the drying time and cost of the film manufacturing process.

The following articles describe polymer compositions showing reversible heat-thickening properties in water:

In *J. Am. Oil Chem. Soc.* 1977, 54, 110—Schmolka, I. R. and *J. of Molecular Liquids* 1984, 27, 165—Rassing, J. et al, the gelation of polyoxyethylenepolyoxypropylene, ABA block copolymers when 20–30% w/w aqueous solutions are heated from a cold melt at 5° C. to 20° C. is described.

In *Macromolecules* 1989, 22(3), 1397—Tanigami, T. et al, a poly(organophosphazene) gelled in water when a 5.4% solution was heated from a cold melt at 0° C. to 30° C. The sol-gel transition was accompanied by a cloud point (the gel was opaque and the cold melt was clear).

In *Macromolecules* 1989, 22(1), 367—Westra, J. G., the heat-thickening properties of a polysaccharide, xanthan, are described.

In *J. Applied Polymer Science* 1961, 5(17), 519—Jeanes, A. et al, polysaccharide B-1459 showed heat-thickening properties in water in the absence of added salts at a concentration of 1% w/w.

Although heat-thickening in water has not been observed in prior art of synthetic polyacrylamides made by vinyl polymerization, some polymers derived from acrylamides and methacrylamides are known that mimic gelatin (form gels on cooling which melt on heating). U.S. Pat. No. 3,396,030—Haas, H. C. et al discloses acylglycinamides with these properties and U.S. Pat. No. 2,486,192—Minsk, et al describes imidized polyacrylamides that gel on cooling.

It has been proposed that polymers be utilized as additions to gelatin or as a substitute for gelatin in photographic film formation.

In U.S. Pat. No. 2,533,166—Jones, it was proposed that polyacrylamides be utilized as substitutes for gelatin in silver halide emulsions. These materials were not reported to gel or heat-thicken.

In U.S. Pat. No. 2,968,558—Clavier et al, a thermoreversible gel formed by copolymerization of acrylic acid and acrylonitrile was claimed for use as a total or partial substitute for gelatin in photographic systems.

In U.S. Pat. No. 2,486,192—Minsk et al, an imidized polyacrylamide was suggested as a synthetic reversible gel for use in photographic materials.

In U.S. Pat. No. 2,522,771—Barnes, polyvinyl alcohol, in combination with other substrates such as amino acids, diketopiperazines, proteins, gelatin, casein, and albumin is reported to form thermoreversible gels.

It would be desirable in manufacturing photographic film to accelerate the drying time by having polymers that when coated from water, either alone or in combination with gelatin, could be dried at a higher temperature. This would require polymers whose aqueous solutions (1–20% weight percent polymer in water) heat-thicken, i.e., show increasing viscosities with increasing temperature. By "increasing viscosity" we mean both moderate increases in which flow can still be observed or large increases resulting in the formation of gels. Polymers that heat-thicken in water may find utility as partial or complete substitutes for gelatin in other areas of photographic film manufacture as well, e.g., interlayers, overcoats, subbing layers, and in silver halide emulsion preparation.

In the manufacture of photographic films, it would be desirable to have polymers that in one temperature range heat-thicken in water and in another temperature range, like gelatin, lose their viscosity with increasing temperature (FIG. 2). Polymers having this type of viscosity-temperature profile would allow the film builder to select different coating temperatures depending on whether chill-setting or heat-setting was preferred before drying.

THE INVENTION

An object of this invention is to provide novel thermoreversible gels.

It is another object of this invention to provide methods of forming aqueous heat-thickening thermoreversible polyacrylamides having varied peak viscosities between 0°–100° C.

It is a further object of this invention to provide polymers whose aqueous solutions form low viscosity melts in two temperature regions separated by a third region of maximum viscosity.

It is another object of this invention to provide thermoreversible polyacrylamides derived from predominantly hydrophobic monomers whose peak viscosities in water occur at or below 20° C., which melt on heating and which chill-set on cooling.

It is another object of this invention to provide novel polymers for coating photographic film layers.

These and other objects of the invention are generally accomplished by providing a polymer that has a hydrophilic group and a hydrophobic group. The hydrophilic group is a polymerizable water soluble ionic vinyl monomer, and the hydrophobic group comprises an acrylamide or methacrylamide monomer that can undergo free radical polymerization, which is insoluble in water, or forms homopolymers that are insoluble in water or which form polymers that exhibit LCST (lower critical solution temperature) properties. Many polymers upon heating precipitate from solution causing a sharp drop in both viscosity and light transmittance. The temperature at which this occurs is called the lower critical solution temperature (LCST).

The preferred polymers of the invention are those represented by the general Formula 1:

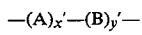  (1)

wherein A represents recurring units derived from one or more hydrophobic N-substituted acrylamide or methacrylamide monomers of the general Formula 2:

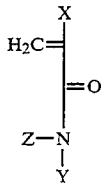  (2)

wherein:
X = H, CH$_3$
Y = H, n-propyl (optional when Z = n-propyl)
Z = alkyl substituents having 3 to 6 carbons including:
(a) 3-carbon saturated substituents:
  isopropyl,
  n-propyl,
  cyclopropyl
(b) 4-carbon saturated alkyl substituents:
  n-butyl,
  sec-butyl,
  iso-butyl, t-butyl,
  cyclobutyl,
  1-methylcyclopropyl,
  2-methylcyclopropyl
(c) 5-carbon substituents:
  n-pentyl,
  1-methylbutyl,
  2-methylbutyl,
  3-methylbutyl,
  1,1-dimethylpropyl,
  2,2-dimethylpropyl,
  1-ethylpropyl,
  1,2-dimethylpropyl,
  cyclopentyl,
  2,2-dimethylcyclopropyl,
  2,3-dimethylcyclopropyl,
  1,3-dimethylcyclopropyl,
  2-methylcyclopropylmethylene,
  1-methylcyclopropylmethylene,
  1-methylcyclobutyl,
  2-methylcyclobutyl,
  3-methylcyclobutyl
  cyclobutylmethylene
(d) 6-carbon saturated alkyl substituents:
  n-hexyl,
  cyclohexyl,
  all branched saturated isomers of hexyl,
  all branched saturated isomers of substituted cyclohexyl, cyclobutyl, and cyclopropyl having a total of 6 carbons,
(e) stereoisometric and optically active forms of the above groups (a-d)
(f) phenyl or 1,1-dimethyl-3-oxo-butyl
(g) combinations of the above groups,
(h) heteroatoms on the hydrophobic fragment.

When (A) in general Formula 1 represents a single hydrophobic N-substituted acrylamide (rather than a combination), and Y of general Formula 2 is H, then x' has the following restrictions:
(a) 3-carbon substituents x' = 96 to 99.9 mole %
(b) 4-carbon substituents x' = 50 to 95 mole %
(c) 5-carbon substituents x' = 40 to 95 mole %
(d) 6-carbon substituents x' = 40 to 95 mole %

When (A) represents a single hydrophobic N-substituted acrylamide and Y = Z = n-propyl, x' = 50-99.9 mole %.

When (A) represents combinations of the groups designated by Z, x' (the total mole % of the combination) ranges from 50 to 99.9 mole %.

y' in general Formula 1 ranges from 60 to 0.1 mole %.

B in general Formula 1 represents recurring units of one or more ionic hydrophilic vinyl monomers of the general Formula 3:

  (3)

wherein:

X = H, CH$_3$

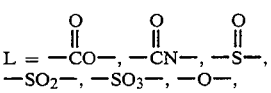

arylene, alkylene, combinations of alkylene and arylene —CO—, —C=N—, —S—, nitrilo, and heterocyclyl containing one or more N, O, S; and combinations of the above groups with alkylene chains Y = an ionic group including heterocyclic ionic groups such as imidazolium, thiazolium, pyridinium, as well as ionic groups such as —NH$_3^+$, —NH$_2$R$^+$, —NHR$_2^+$, —NR$_3^+$, =NR$_2^+$, CO$_2^-$, SO$_2^-$, —SO$_3^-$, —O$^-$, —OPO$_3$, and —SR$_2^+$, wherein R = lower alkyl of 1 to 10 carbons, and associated counterions of these ionic groups, e.g., halide, alkali metal, ammonium, etc.

It should be understood from the general description that the hydrophilic (B) portion can be selected from any class of vinyl monomer having an ionic group that can undergo free radical polymerization, including vinyl ketones, N-vinyl amides, N-vinyl lactams, vinyl imidazoles, vinyl pyridines, vinyl sulfones, vinyl ethers, vinyl esters, vinyl urylenes, vinyl urethanes, vinyl nitriles, vinyl anhydrides, vinyl imines, vinyl imides, vinyl halides, vinyl aldehydes, styrenes and substituted styrenes, vinyl naphthalenes, vinyl heterocycles containing oxygen, nitrogen, or sulfur and combinations of these heteroatoms, acrylamides, methacrylamides, acrylates, and methacrylates. Representative monomers include sodium acrylate, N-3-aminopropylmethacrylamide hydrochloride, p-styrenesulfonic acid sodium salt, N-3-dimethylaminopropylmethacrylamide hydrochloride, N-vinylimidazole hydrochloride, vinyl pyridine hydrochloride, N-2-sulfo-1,1-dimethylethylacrylamide sodium salt, and 2-aminoethylmethacrylate hydrochloride. In addition, (B) in Formula 1 can be derived from vinyl monomers known to undergo free radical polymerization which can undergo a subsequent reaction resulting in the formation of an ionic group, e.g., by hydrolysis, or by pH induced protonation or deprotonation. An example would be maleic anhydride which can be hydrolyzed by standard hydroxide base to give a carboxylate salt. It should also be understood that Y in general Fromula 3 can contain one or more ionic groups of similar or opposite charge.

Other examples of anionic and cationic monomers are listed in *Research Disclosure* 19551, July 1980.

The hydrophilic monomer B of Formula 1 bearing an ionic group represented by Formula 3 may be partially substituted with other hydrophilic ionic monomers having the same or opposite charge as represented by Formula 3, or by hydrophilic nonionic monomers not represented by Formula 3. The substitute ionic or nonionic hydrophilic monomer may comprise up to 59.9 mole percent, as long as the ionic content represented by B is present in at least 0.1 mole percent. The substitute ionic or nonionic hydrophilic monomer can be selected from virtually any class of vinyl monomer capable of undergoing free radical polymerization. Representative monomers include but are not limited to acrylamide, N-methylacrylamide, N,N-dimethylacrylamide, and 2-hydroxyethylacrylate. See *Research Disclosure* 19551 for other examples. The substitute ionic or nonionic monomer may also be derived from any other monomer used to make the polymer, which can include hydrophilic monomer B of Formula 1 or hydrophobic monomer A of Formula 1, either by subsequent pH induced change in ionization or chemical modification of the polymer after polymerization.

In addition, the hydrophobic monomer A of Formula 1 may be partially substituted with other hydrophobic monomers represented by general Formula 2 or by other hydrophobic monomers not represented by Formula 2, to an extent generally less than 40 mole percent and most preferably less than 20 mole percent. These can be selected from any class of vinyl monomer capable of undergoing free radical polymerization. They may also be derived from any other monomer used to make the polymer either by subsequent chemical modification of the polymer or by pH induced change in ionization to give an uncharged rather than ionic form. The substitute hydrophobic monomer may be one that is either insoluble in water, or form homopolymers that are insoluble in water, or form homopolymers that exhibit LCST properties.

Other vinyl monomers having either hydrophobic or hydrophilic properties may be incorporated as well, as long as one maintains the proper overall hydrophobic-hydrophilic balance according to the designations for x' and y' in Formula 1 above.

Cationic, anionic, and mixed anionic/cationic heat-thickening polymers are prepared by combination of monomers from the above general classes of materials.

For a given polymer in water, the position and magnitude of the peak viscosity will depend on molecular weight, concentration, presence of added salts, hydrophobic-hydrophilic balance of comonomers, polymerization solvent, pH, rate of heating or cooling, the presence of organic cosolvents and their concentration, compositional heterogeneity (monomer distribution), and shear rate. All of these factors effect the shape of the viscosity/temperature curve. As observed in FIG. 5, the viscosity vs. temperature curve for a heated sample can appear quite different from the curve obtained by cooling the sample through the same temperature region (hysteresis). Curve A was observed by heating the polymer obtained in Example 1, concentration 3.2% w/w in water, at a rate of 1° C./min. from 5° C. to 75° C. under dynamic shear conditions of 1% strain and at an oscillating frequency of 10 rad/sec. Curve B was obtained by cooling the same sample under identical conditions from 75° C. to 5° C. The curves can be reproduced as long as the sample solution has been cycled back to the starting temperature.

MODES OF PERFORMING THE INVENTION

Figure 1:
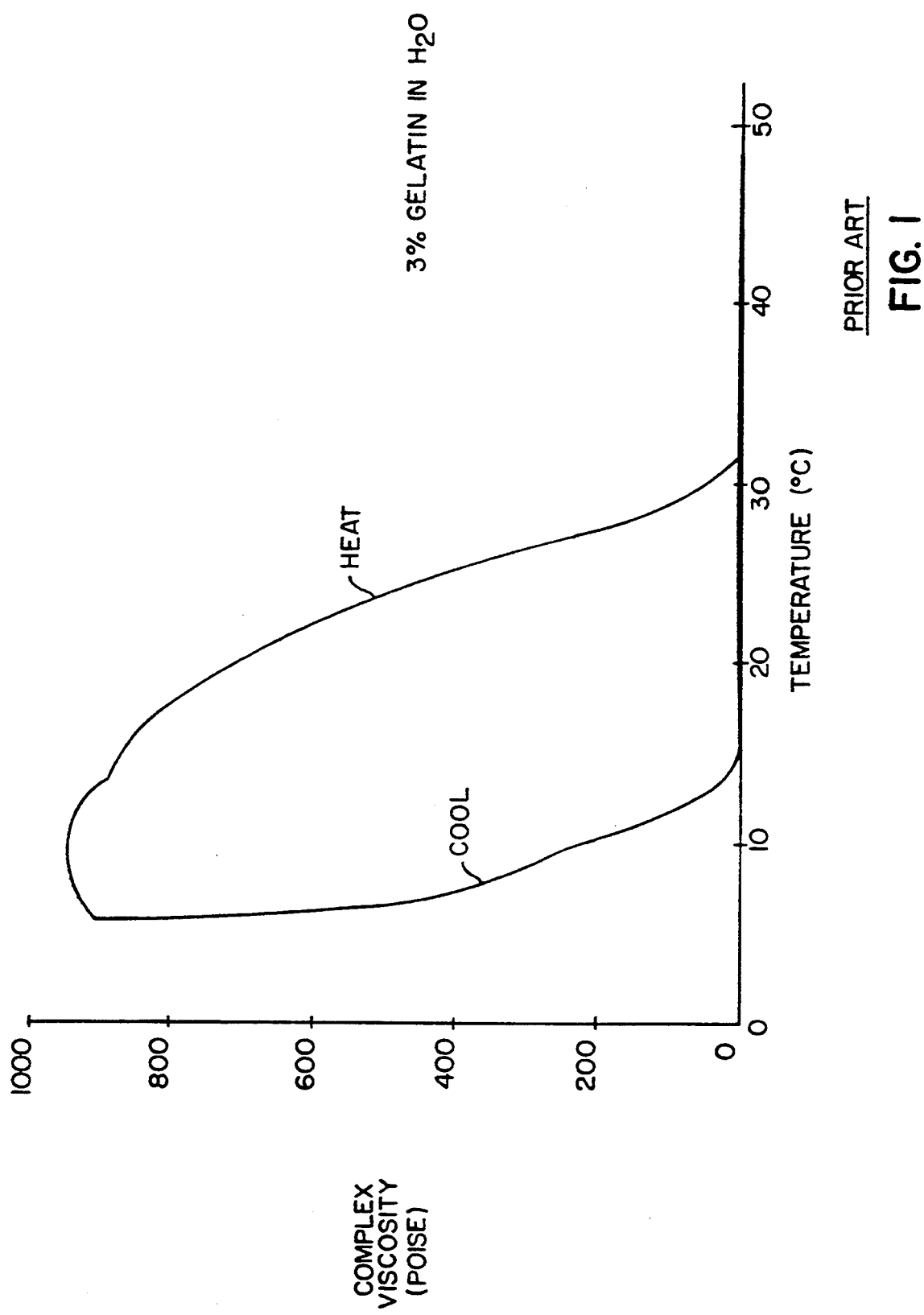
FIG. 1 illustrates the heating and cooling viscosity curves for a prior gelatin and water solution.
Figure 2:
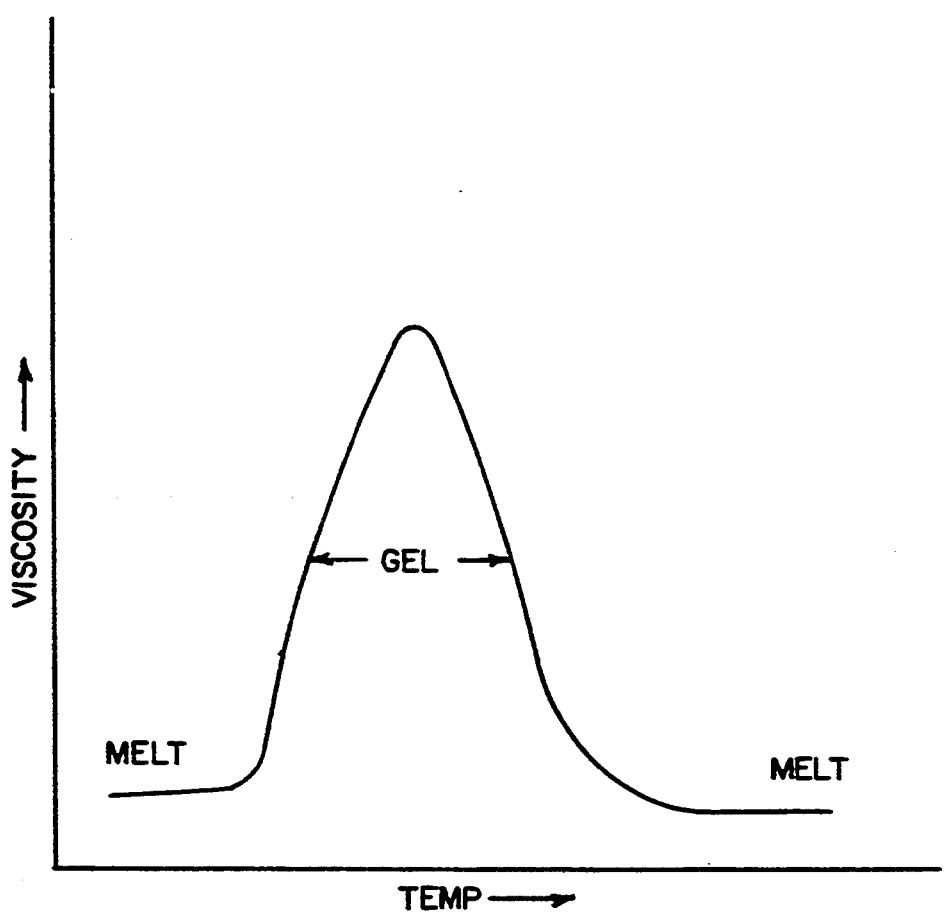
FIGS. 2, 3, and 4 illustrate the heating curves for materials of the invention.
Figure 3:
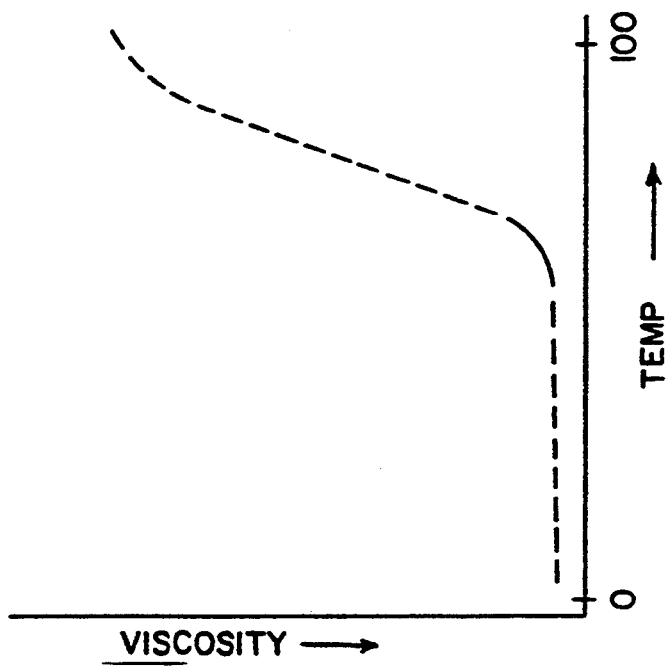
Figure 4:
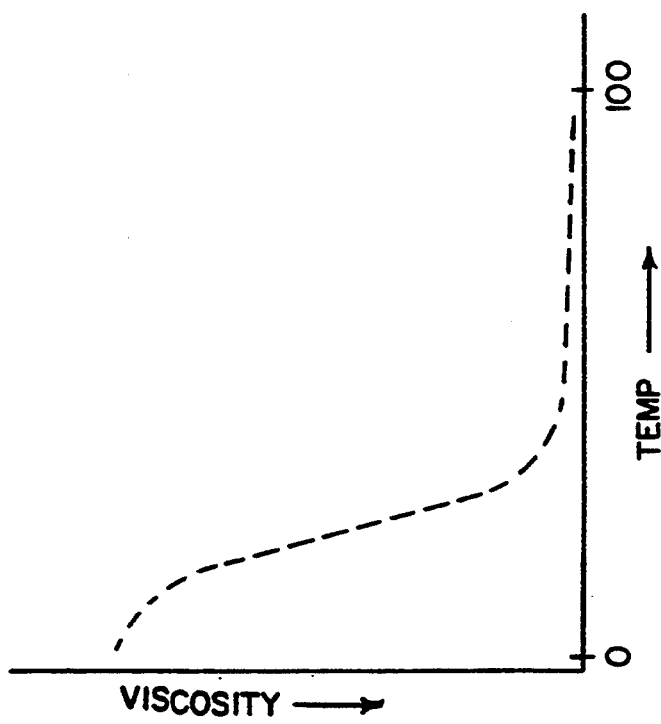

To our knowledge there are no prior reported examples of synthetic heat-thickening polyamides, nor are there synthetic polyamides which have peak viscosities in water between two temperature regions in which they form low viscosity melts, as shown in FIG. 2. The invention polymers are highly desirable compositions as their peak viscosities in water could be varied over the entire liquid temperature range of water (0°–100° C). For polymers whose peak positions lie near the boiling point of water, only the left half of the viscosity curve will be measurable (FIG. 3). Similarly, for those near freezing point, only the right half of the curve will be measurable (FIG. 4).

A further advantage of the invention polymers is that heat-thickening is not accompanied by large changes in free volume of the polymer solution (syneresis), precipitation of the polymer, or significant changes in the optical transmission properties of the polymer solutions. A particular advantage over gelatin is realized in that invention polymers are soluble in common organic solvents such as methanol, ethanol, acetone, isopropyl alcohol, and tetrahydrofuran.

These and other advantages are accomplished by providing a polymer that is comprised of a hydrophilic portion and a hydrophobic portion. The hydrophilic portion of the polymer comprises a polymerizable water soluble ionic vinyl monomer. The hydrophobic portion comprises an acrylamide or methacrylamide monomer that can undergo free radical polymerization, which is insoluble in water or forms homopolymers that are insoluble in water, or which forms polymers that exhibit LCST (lower critical solution temperature) properties. In addition, as long as at least 1 mole percent polymerizable water soluble ionic vinyl monomers is present, the polymerizable water soluble ionic vinyl monomer may be substituted by a nonionic hydrophilic vinyl monomer. The hydrophilic ionic portion is rendered ionic by charged functional groups, preferably $NH_3^+$, $NH_2R^+$, $NHR_2^+$, and $NR_3^+$, $CO_2^-$, $SO_3^-$, $O^-$, $-SR_2^+$, $OPO_2^-$, $SO_2^-$, or mixtures thereof. R is defined as lower alkyl of between 1 and 10 carbons.

It is believed that in Formula 2, some of the hydrogen may be substituted with one or more fluorine, chlorine, bromine, iodine, alkoxy, acyloxy, sulfoxyalkyl, sulfoalkyl, nitro, thio, keto, or nitrile groups and retain the invention properties.

It should be understood from the general description that the ionic hydrophilic portion can be selected from any class of vinyl monomer having an ionic group that can undergo free radical polymerization.

Other vinyl monomers having either hydrophobic or hydrophilic properties may be incorporated as well, as long as one maintains the proper overall hydrophobic-hydrophilic balance required for heat-thickening behavior.

Cationic, anionic, and mixed anionic/cationic heat-thickening polymers are prepared by combination of monomers from the above general classes of materials. For a given polymer in water, the position and magnitude of the peak viscosity will depend on molecular weight, concentration, presence of added salts, hydrophobic-hydrophilic balance of comonomers, polymerization solvent, pH, rate of heating or cooling, the presence of organic cosolvents and their concentration, compositional heterogeneity (monomer distribution), and shear rate. All of these factors effect the shape of the viscosity/temperature curve.

The most preferred embodiments of the invention are those in which in Formula 2, the Z equals isopropyl, n-butyl, sec-butyl, iso-butyl, t-butyl, or 1,1-dimethylpropyl. Also, most preferred embodiments are those in which in Formula 3, the L equals

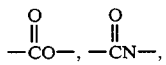

or arylene. Further, most preferred embodiments are those where Y in formula B is an amine having $NH_3^+$, $NH_2R^+$, $NHR_2^+$, $NR_3^+$ wherein R equals lower alkyl having 1-10 carbons, $CO_2^-$ and $SO_3^-$.

Figure 5:
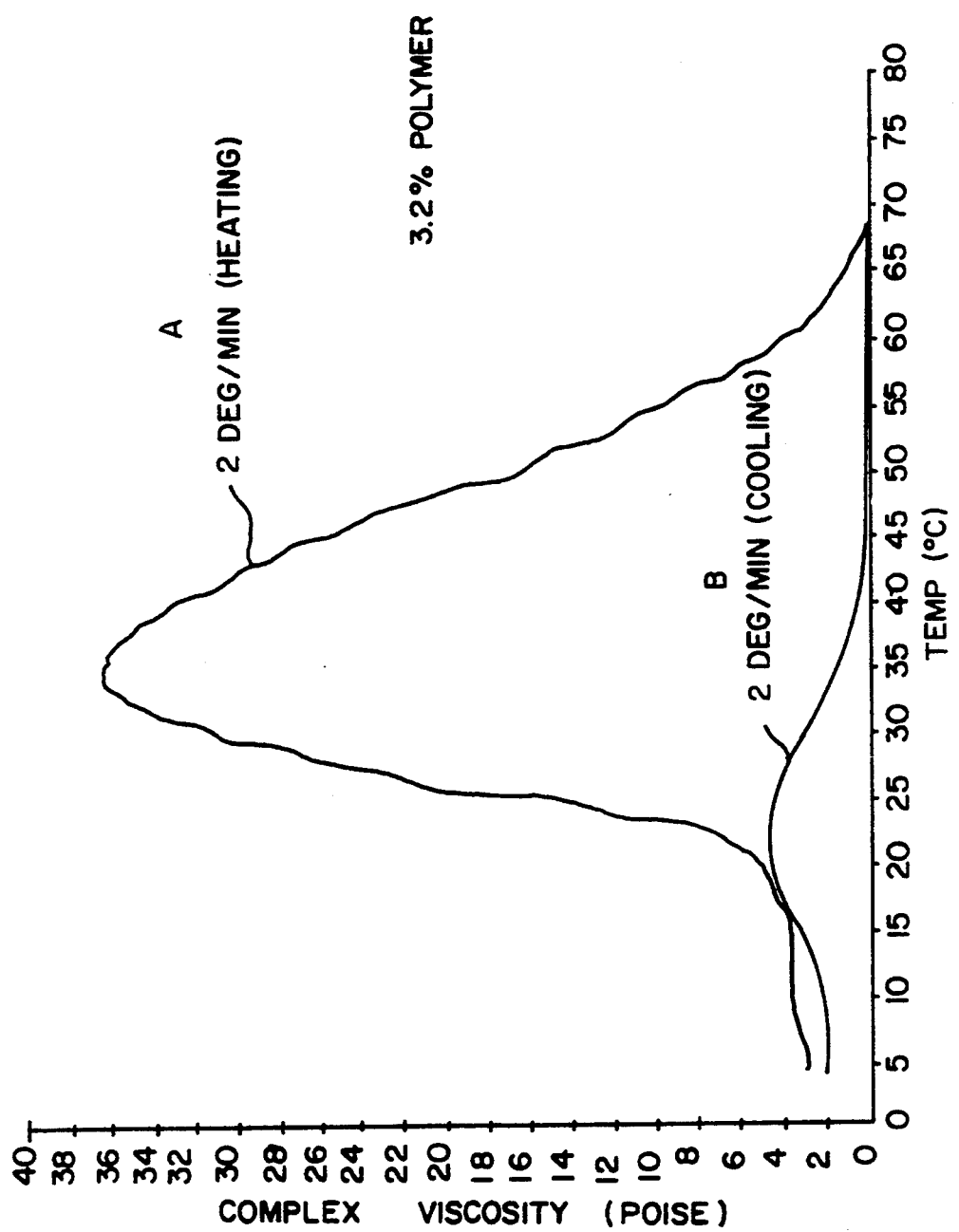
FIG. 5 is a heating and cooling viscosity curve of a material of the invention.

As observed in FIG. 5, the viscosity vs. temperature curve for a heated sample can appear quite different from the curve obtained by cooling the sample through the same temperature region (hysteresis). Curve A was observed by heating the polymer obtained in Example 1, concentration 3.2% weight percent polymer in water, at a rate of 1° C./min from 5° C. to 75° C. under dynamic shear conditions of 1% strain and at an oscillating frequency of 10 rad/sec. Curve B was obtained by cooling the same sample under identical conditions from 75° C. to 5° C. The curves can be reproduced as long as the sample solution is cycled back to the starting temperature.

Unlike gelatin and other materials described in the section on prior art, the polymers described here are generally soluble in acetone, methanol, ethanol, tetrahydrofuran, isopropanol and mixtures of these solvents and water. However, the invention polymers show heat-thickening properties only in a predominantly aqueous solvent system. Solution properties of the polymers in organic solvents are typical, e.g., their viscosities decrease with increasing temperature between 0°–100° C. However, organic solvents can be used to modulate the peak viscosity of the polymers in water if they are restricted to less than 50 weight percent of the total solvent, preferably less than 20%.

Generally, for the polymers of this invention, peak viscosities in water shift to higher temperatures with increasing hydrophilicity of the polymer, and to lower temperatures with the addition of small amounts of organic cosolvent (<20% by weight of total solution). A smaller hysteresis has been seen for the more hydrophilic polymers. Added salts, such as potassium chloride, sodium sulfate, sodium chloride, lithium chloride, and calcium chloride, cause a shift in the peak viscosity toward lower temperatures and an increase in the magnitude of the peak until at very high concentrations the polymers precipitate or show a cloud point on heating. Higher molecular weights also cause an increase in the magnitude of the peak. High concentrations of urea (~4M) result in a total loss of heat-thickening properties.

The appearance of the polymers in water can range from clear to milky white. Generally, the optical transmission properties do not significantly change upon heating the samples through a complete temperature cycle. Very slight haziness has been observed, however, when heating samples that contain more than 95% m/m hydrophobic monomer, particularly 97% or greater.. Generally, however, there is no observable change in the clarity of the polymer solutions as they are heated through their viscosity maxima, e.g., a clear melt at low temperature will remain clear as it is heated through its gel peak. Likewise, in those samples that are milky when dispersed in pure water, the presence of a dispersed phase does not appear to inhibit the heat-thickening properties of the sample. The polymers of the invention are clear when dried even if milky white when in water solution.

The gelation properties of these polymers are particularly beneficial in coating applications where a low viscosity solution (<10 cps) is applied to non-absorbent supports, such as cellulose triacetate or polyethylene terephthalate. Such layers may function as subbing layers, antihalation layers, antistatic and lubricating layers, particularly when applied to the opposite side from the light sensitive layers. In a typical coating operation in which a solution is applied from a hopper to a moving support, there is a critical period before the solvent is fully evaporated when the coated layer has no rigidity, and may be disturbed by several causes, including vibrations from the machine, a possible vertical rise of the moving web, or impinging air currents from the drying section. The latter type of disturbance, referred to simply as "blowing", is particularly prevalent when the initial viscosity is low, (<10 cps) and the amount of water to be removed is great, resulting in extreme coating non-uniformities such as waves and lines. Another typical defect associated with low viscosity coating solutions is a heavy "edge bead", caused by the high accumulation of coated material at the very edge of the coating. Eventually, solvent evaporation results in a high enough viscosity so that adequate rigidity is obtained, but often this occurs after the aforementioned defects have set in.

Gelatin solutions offer rapid rigidity and hence better coating uniformity prior to the evaporation of water by the chill setting property, whereby gelation occurs when a warm solution is cooled below the gel point upon application to the support. The polymers of this invention can also be chill set to offer solution rigidity prior to water evaporation, but also have the added flexibility to be "heat set" when the situation demands it by cooling the solution below the gel region and immediately warming it to the gel point upon coating. The advantage of heat setting, particularly when coating on bare supports, is that the layer is set and evaporated in one rapid step, rather than in a gradual process as with gelatin solutions where the coated layer is first chilled and then gently heated to drive off the water without remelting the layer before dryness is achieved. Heat setting would allow for faster drying and hence faster coating speeds on smaller coating machines with less drying capacity.

Another advantage of the polymers of this invention for high speed machine coatings is the ability to vary the temperature of gelation and liquid by slight alterations in the polymer composition, so that desired coating temperatures can be matched. In addition, the ability to vary the ionic portion of the polymer and to include some functional monomers enables these polymers to be tailored for specific chemical and physical properties.

The polymers of the invention generally are formed using about 30 to about 99.9 mole percent of a hydrophobic monomer of the general Formula 1 and about 70 to about 0.1 mole percent of a hydrophilic monomer having an ionic group selected from materials having the general Formula 2 or the general Formula 3.

The hydrophilic monomer of Formula 1 bearing an ionic group represented by Formula 3 may be partially substituted with other hydrophilic ionic monomers having the same or opposite charge as represented by Formula 3. The substitute ionic or nonionic hydrophilic monomer may comprise up to 69 mole percent, as long as the ionic content represented by B is present in at least 0.1 mole percent. The substitute ionic or nonionic hydrophilic monomer can be selected from virtually any class of vinyl monomer capable of undergoing free radical polymerization. Representative nonionic monomers preferred are acrylamide, N-methylacrylamide, N,N-dimethylacrylamide, and 2-hydroxyethylacrylate. Other suitable nonionic monomers are allyl alcohol
N-methylolacrylamide
N-(3- or 5-hydroxymethyl-2-methyl-4-oxo-2-pentyl)acrylamide
bis(1-dimethylaminoethyl)methyl methacrylate
N-(isobutoxymethyl)acrylamide
N-(isobutoxymethyl)methacrylamide
N-(m- and p-vinylbenzyl)-N,N-dimethylamine
m- and p-vinylbenzyl alcohol
cyanomethyl methacrylate
2-poly(ethyleneoxy)ethyl acrylate
2-cyanoethyl methacrylate
ethyl acrylamidoacetate
methacryloyloxypolyglycerol
glyceryl methacrylate
N-(m-hydroxyphenyl)methacrylamide
2-hydroxyethyl acrylate
2-hydroxypropyl acrylate
N-(1,1-dimethyl-3-dimethylaminopropyl)acrylamide
2-methyl-1-vinylimidazole
1-vinylimidazole
N-vinyl-e-caprolactam
p-methanesulsonamidostyrene
N-methylmethacrylamide
N,N-di(cyanomethyl)acrylamide
methacrylamide
maleic anhydride
2-hydroxyethyl methacrylate
N-methylolmaleimide
methacryloylurea
acrylonitrile
2-chloroacrylonitrile
methacrylonitrile
N-(2-hydroxypropyl)methacrylamide
N-acryloylpiperidine
N-vinylsuccinimide
2-hydroxypropyl methacrylate
2-(5-ethyl-2-pyridyl)ethyl acrylate
N-(3-methacryloyloxypropyl)thiourea
N-vinyl-2-pyrrolidone
p-aminostyrene
N,N-dicyanomethylmethacrylamide
2-methyl-5-vinylpyridine
N-vinylcarbazole
2-vinylpyridine
4-vinylpyridine
N,N-dimethylacrylamide
2-(diethylamino)ethyl acrylate
2-(dimethylamino(ethyl acrylate
2-(dimethylamino)ethyl methacrylate
2-(diethylamino)ethyl methacrylate
3-{3-(dimethylamino)propyl}acrylamide
3-{-2-(dimethylamino)ethyl}acrylamide
3-{-2-(dimethylamino)ethyl}methacrylamide
3-(diethylamino)propyl acrylate
4-(diethylamino)-1-methylbutyl acrylate The substitute ionic or nonionic monomer may also be derived from any other monomer used to make the polymer, which can include hydrophilic monomer B of Formula 1 or hydrophobic monomer A of Formula 1, either by subsequent pH induced changed in ionization or chemical modification of the polymer after polymerization.

In addition, the hydrophobic monomer A of Formula 1 may be partially substituted with other hydrophobic monomers represented by general Formula 2 or by other hydrophobic monomers not represented by Formula 2, to an extent generally less than 60 mole percent and preferably less than 20 mole percent. These can be selected from any class of vinyl monomer capable of undergoing free radical polymerization. They may also be derived from any other monomer used to make the polymer either by subsequent chemical modification of the polymer or by pH induced change in ionization to give an uncharged rather than ionic form. The substitute hydrophobic monomer may be one that is either insoluble in water, or form homopolymers that are insoluble in water, or form homopolymers that exhibit LCST properties.

The polymers are formed in an organic solvent/water mixture, preferably methanol/water 1:1 volume ratio and most preferably methanol/water 2:1 volume ratio. Other solvents such as acetone, ethanol, dimethylformamide, dimethylsulfoxide, and dimethylacetamide may be substituted or added as necessary to control molecular weight, or to maintain solution. A preferred solvent will not cause precipitation of the polymer during the course of the reaction.

In a preferred embodiment, monomers are combined in a solvent that dissolves all reactants completely at 60° C. or, most preferably, at 25° C. Initiation may be accomplished by standard free radical initiators known in the art, potassium persulfate, or azoisobutyronitrile and other related materials. The concentration of monomers ranges from 10–40% weight monomer in water (w/w), preferably 15% weight monomer in water, and the initiator concentration ranges from 0.25 mole percent to 5 mole percent, preferably 1.0 mole percent relative to the combined moles of all monomers. Weight in water w/w means the percent of monomer, by weight, as a percentage of total solution weight, i.e., a 20% (w/w) solution is 20% polymer and 80% water. The preferred reaction temperature is 60°–65° C.

The polymers are typically prepared in batch mode, e.g., all monomers are combined before initiation. Changes in mode of addition, or solvents results in a variation in the heating and cooling profiles of the product polymers. There is no preferred mode of addition because this depends on the desired heat-thickening properties; however, modes of addition that cause block monomer distributions are not preferred. Generally, heat-thickening properties are favored by random incorporation of the monomers during chain growth. The molecular weight range for polymers of the invention extends from 20K to 1000K, most preferably 100–350K and determined by the GPC (polyvinyl pyrolidine equivalent) method.

Polymers within the scope of this invention will heat-thicken at concentrations of 1–20% weight monomer in water (w/w), and preferably 1–10%, in a predominantly aqueous solvent system (>50% percent by total volume (v/v) water). Measurements were made using either a Brookfield viscometer at constant shear or an oscillating plate rheometer (Rheometrics) with a frequency ($\omega$) range of 0.01 to 100 radians/sec and a percent strain ($\gamma$) of 1–25%. Typically, the strain was 1–10%, the frequency was 10 radians/sec, the heating rate was 1° C./min, and the concentration was 2–10% w/w. The shear rate for the Brookfield measurement typically was between about 0.4 and 80 sec$^{-1}$.

Repeat units and parent monomer names referenced in specific thermoreversible polymers of this invention are listed below:

—CH$_2$—CH—  N-Isopropylacrylamide (IPA) (hydrophobic)
|
C=O
|
NH
|
CH(CH$_3$)$_2$ —CH$_2$—CH—  N-t-butylacrylamide (TBA) (hydrophobic)
|
C=O
|
NH
|
C(CH$_3$)$_3$ —CH$_2$—CH—  N-n-butylacrylamide (NBA) (hydrophobic)
|
C=O
|
NH
|
n-Bu —CH$_2$—CH—  N-sec-butylamide (SBA) (hydrophobic)
|
C=O
|
NH
|
CH(CH$_3$)(Et)

—CH$_2$—CH—  N-isobutylacrylamide (IBA) (hydrophobic)
|
C=O
|
NH
|
CH$_2$CH(CH$_3$)$_2$ —CH$_2$—CH—  N-t-pentylacrylamide (TPA) (hydrophobic)
|
C=O
|
NH
|
C(CH$_3$)$_2$Et —CH$_2$—CH—  N-(1,1-dimethyl-3-oxobutyl)-acrylamide (DOA) (hydrophobic)
|
C=O
|
NH
|
C(CH$_3$)$_2$CH$_2$C(=O)CH$_3$ —CH$_2$—C(CH$_3$)—  N-(3-aminopropyl)methacrylamide hydrochloride (APM) (hydrophilic)
|
C=O
|
NH
|
(CH$_2$)$_3$
|
NH$_3^+$Cl$^-$ —CH$_2$—C(CH$_3$)—  N-3-(N,N-dimethylamino)propylmethacrylamide HCl (DMM) (hydrophilic)
|
C=O
|
NH
|
(CH$_2$)$_3$
|
HN$^+$(CH$_3$)$_2$ Cl$^-$ —CH$_2$—CH—  Acrylamide (A) (hydrophilic)
|
C=O
|
NH$_2$ —CH$_2$—CH—  N-2-carboxyethylacrylamide (CEA) (hydrophilic)
|
C=O
|
NH
|
CH$_2$CH$_2$COOH

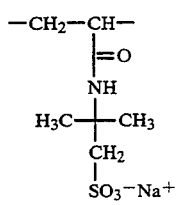

N-(2-sulfo-1,1-dimethyl-
ethyl) acrylamide
sodium salt
(SSA) (hydrophilic)

Specific examples of thermoreversible polymers of this invention are listed in Table 1.

TABLE 1

| COMPOSITION | MOLE RATIO (%) |
|---|---|
| TBA:APM | 80:20 |
| TBA:APM | 85:15 |
| TBA:APM | 75:25 |
| TBA:SSA | 80:20 |
| TBA:SSA | 85:15 |
| TBA:A:SSA | 75:20:05 |
| TBA:A:SSA:APM | 65:20:05:10 |
| TBA:A:SSA:APM | 60:25:10:05 |
| TBA:A:SSA:APM | 65:20:10:05 |
| TBA:A:CEA:APM | 60:30:05:05 |
| TBA:A:CEA:APM | 65:25:05:05 |
| TBA:A:APM | 75:05:20 |
| TBA:A:APM | 70:10:20 |
| TBA:A:APM | 65:15:20 |
| TBA:A:APM | 60:20:20 |
| TBA:A:APM | 55:25:20 |
| TBA:A:APM | 50:30:20 |
| TBA:CEA:APM | 70:10:20 |
| TBA:CEA:APM | 60:20:20 |
| TBA:CEA:APM | 50:30:20 |
| TBA:DOA:APM | 60:20:20 |
| TBA:IPA:APM | 45:45:10 |
| TBA:IPA:APM | 50:30:20 |
| IPA:APM | 97:03 |
| DOA:APM | 90:10 |
| NBA:APM | 80:20 |
| TBA:SA | 50:50 |
| IBA:APM | 85:15 |
| IBA:APM | 90:10 |
| SBA:APM | 80:20 |
| SBA:APM | 85:15 |
| TPA:APM | 80:20 |
| TBA:IPA:SSA:APM | 45:35:15:5 |
| TBA:IPA:SSA:APM | 40:40:15:5 |
| SBA:IPA:SSA:APM | 60:20:15:5 |

The following examples illustrate the preparation of polymers within the scope of this invention:

EXAMPLE 1

TBA:APM 80:20-m

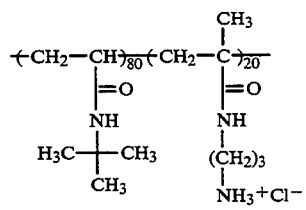

t-Butylacrylamide (101.6 g, 0.80 moles) and 3-aminopropylmethacrylamide hydrochloride (35.6 g, 0.20 moles) were combined at ambient temperature with methanol (350 ml) and water (350 ml). The mixture was purged 15 minutes with nitrogen and was then heated to 60° C. The starting materials dissolved within 10 min. at which time AIBN (1.6 g, 0.01 moles in 60 ml methanol) was added in one portion. The solution became slightly hazy over an 18-hour period. The solution was diluted with 700 ml water and was concentrated in an open beaker with a nitrogen inlet at 60° C. until about 300 ml had been removed.

| wt 1255 g | 10.23% solids | theory C 61.15 H 9.82 N 12.22 Cl 5.15 found C 59.93 H 9.71 N 11.95 Cl 5.19

| iv | (.25% in .1N LiCl/methanol) 1.06 |
| wt % APM | 25.4, 26.3 (reethanol, titrated with hexadecyl trimethylammonium hydroxide (HDTMAH)) |
| wt % HCl | .74, .55 |
| w % MEOH | 9.1 |

The heating and cooling viscosity curves for this sample at 3.7% solids are shown in FIG. 5.

Approximately half of the polymer was hot diafiltered (50° C., 20K cutoff, 20 liters effluent) and was then concentrated in an open beaker at 60° C. using a nitrogen sweep.

| wt | 577 g, 7.2% solids |
| iv | 1.09 dL/g (.25% in .1N LiCl/MeOH) |
| wt % APM | 23.7 |
| wt % HCl | <0.1 |
| GC | < 1% methanol, acetone, ethanol. | found C 60.46 H 9.80 N 12.06 Cl 5.0

EXAMPLE 2

DOA:APM 90:10-m

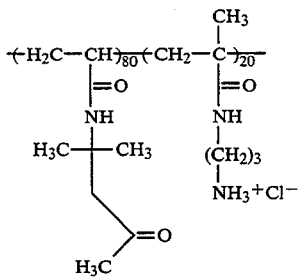

Methanol (350 ml), water (100 ml), diacetoneacrylamide (152.0 g, 0.90)

N-3-aminopropylmethacrylamide hydrochloride (17.8 g, 0.10 moles) were combined at 20° C. The mixture was purged with nitrogen for 15 minutes and was then warmed to 60° C. The solution was purged an additional 10 minutes, after which AIBN (1.6 g) in 20 ml acetone was added in one portion. The solution was maintained under positive nitrogen pressure with a slow bleed for the entire reaction time (18 hours). The resulting viscous solution was diluted with water (approximately 1 liter) to give a latex-like suspension that was concentrated at 70° C. in an open beaker using a nitrogen sweep.

| wt. 1011 g | 14.8% solids |
| wt % APM | 10.4 |
| wt % HCl | .14 |
| iv | .980 dL/g (.25% in .1N LiCl/MeOH) | theory C 62.11 H 8.88 N 9.05 Cl 2.08 found C 61.22 H 8.68 N 9.02 Cl 2.23

Figure 6:
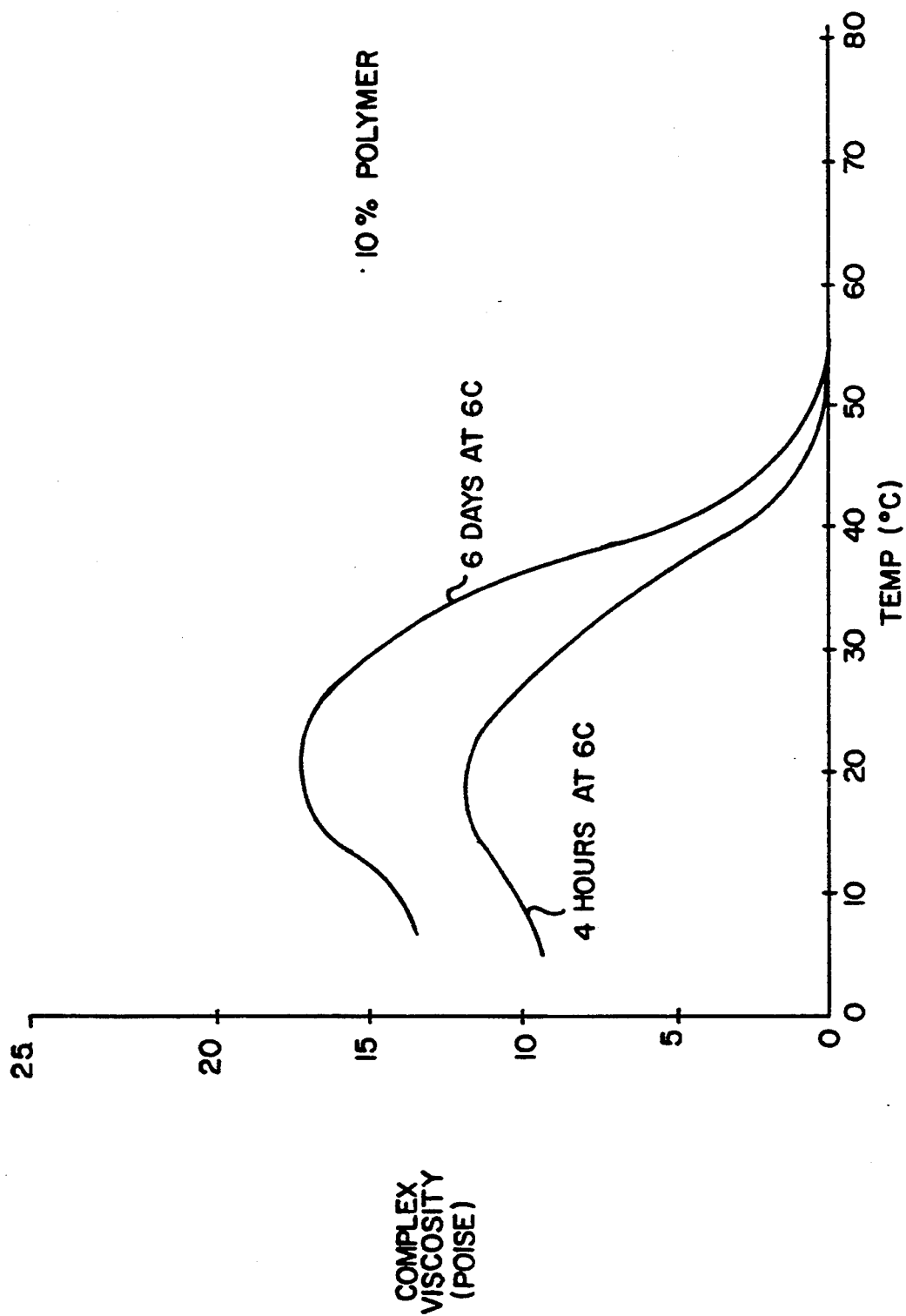
FIGS. 6–13 illustrate heating and cooling viscosity curves of materials of the invention.

The heating curves after equilibrating this sample for 4 hours and 6 days at 6° C., and 10% solids, are shown in FIG. 6.

EXAMPLE 3

TBA:SSA 80:20-m

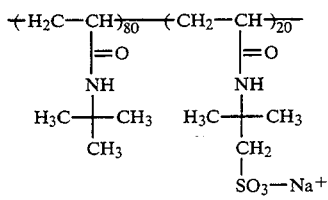

DMSO (500 ml), EtOH (60 ml), t-butylacrylamide (101.6 g, 0.80 moles), and N-2-sulfo-1,1-dimethylethyl acrylamide sodium salt (46 g, 0.20 moles) were combined at ambient temperature to give a pale yellow solution that was purged with nitrogen for 15 min. The solution was heated to 60° C. followed by the addition of AIBN (1.6 g) in acetone (20 ml). The reaction mixture remained clear while heating for 48 hours. The product was diafiltered (20K cutoff, 20 liters effluent) against water.

| wt. | 1563 g 7.6% solids |
| --- | --- |
| iv | .554 dL/g (.25% in .1N LiCl/MeOH) |
| wt % SSA | 28.5 | theory C 56.87 H 8.86 N 9.48 found C 56.10 H 8.77 N 9.27

Figure 7:
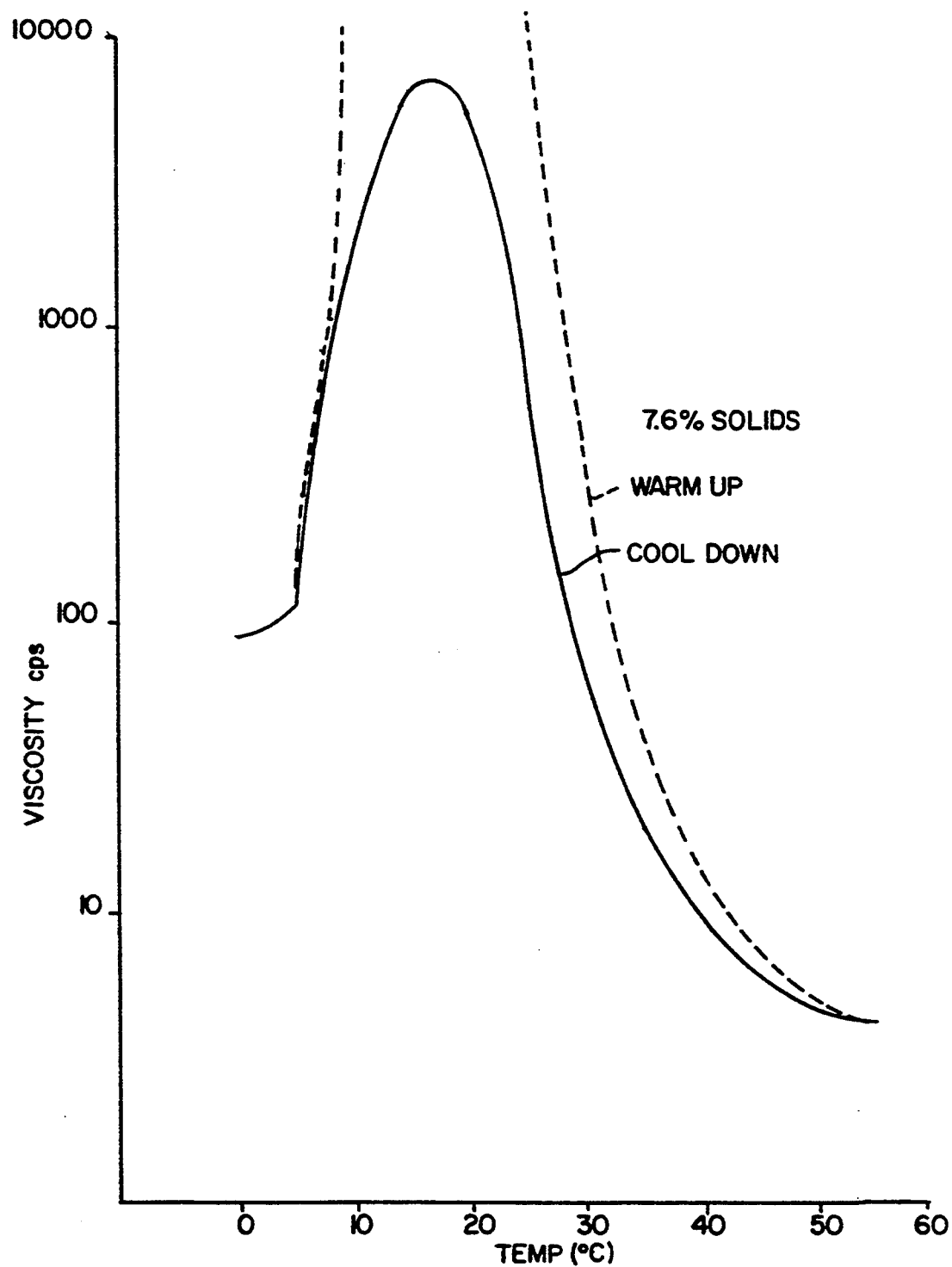

The heating and cooling viscosity curves for this sample at 7.6% solids are shown in FIG. 7.

EXAMPLE 4

TBA:A:SSA 75:20:5-m

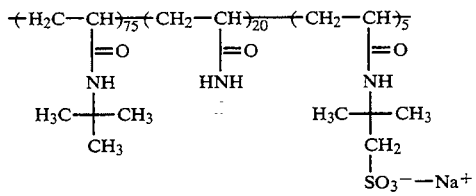

Methanol (350 ml), water (100 ml), t-butylacrylamide (95.3 g, 0.75 moles), acrylamide (14.2 g, 0.20 moles), and N-2-sulfo-1,1-dimethylethylacrylamide sodium salt (11.5 g, 0.05 moles) were combined at 20° C. The mixture was purged with nitrogen for 15 minutes and was then warmed to 60° C. The solution was purged an additional 10 minutes, after which AIBN (1.6 g) in 20 ml acetone was added in one portion. The solution was maintained under positive nitrogen pressure with a slow bleed for the entire reaction time (18 hours). The reaction remained clear in the methanol but turned white upon addition of water (1 liter). No particulates could be seen. The product was stripped at 70° C. with a nitrogen sweep in an open beaker to give a white gel.

| wt. | 536 g 19.4% solids |
| --- | --- |
| iv | .927 (.25% in .1N LiCl/MeOH) | theory C 61.48 H 9.49 N 11.56 S 1.32 found C 57.69 H 9.35 N 10.99 S 1.01

| wt % SSA | 8.95, theory 9.5 |
| --- | --- |

Figure 8:
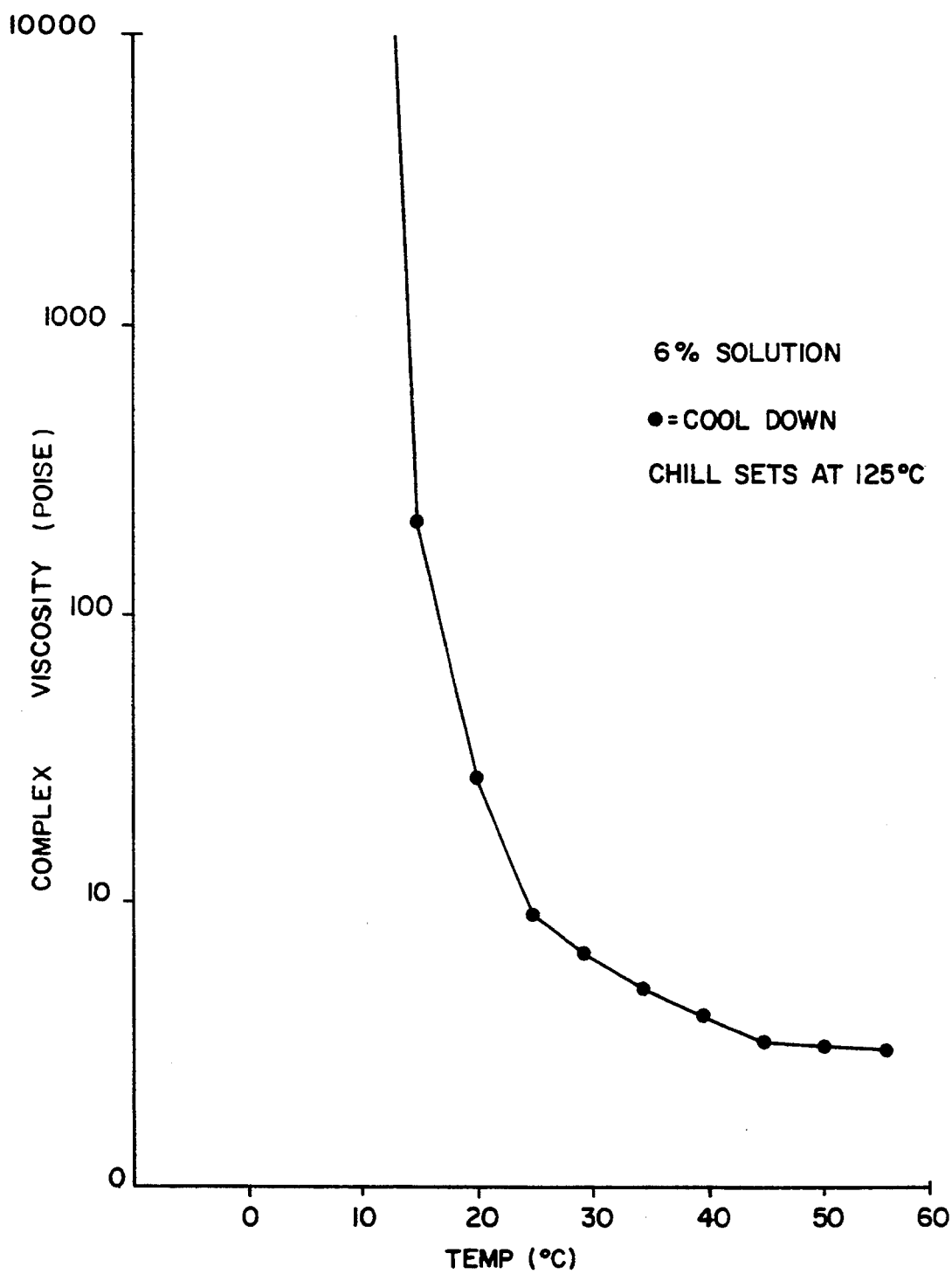

The cooling viscosity curve for this sample at 6.0% solids is shown in FIG. 8.

EXAMPLE 5

TBA:A:SSA:APM 65:20:5:10-m

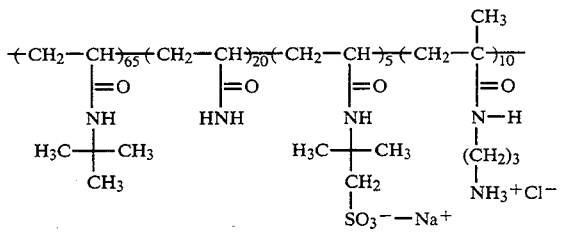

The reaction conditions were identical to those described in Example 4. Monomer feeds were t-butylacrylamide (82.5 g, 0.65 moles), acrylamide (14.2 g, 0.20 moles), N-(2-sulfo-1,1,-dimethylethyl) acrylamide sodium salt (11.5 g, 0.05 moles), and N-3-aminopropylmethacrylamide hydrochloride (17.8 g, 0.10 moles).

| wt. | 1073 g 10.7% solids |
| --- | --- |
| iv | 1.01 dl/gm (.25% in .1N MeOH/LiCl) |
| wt % APM | 15.4 |
| wt % HCl | .072 |
| wt % SSA | 11.4 | theory C 58.97 H 9.26 N 12.20 Cl 2.81 S 1.27 found C 57.16 H 9.88 N 11.85 Cl 2.42 S 1.24

Figure 9:
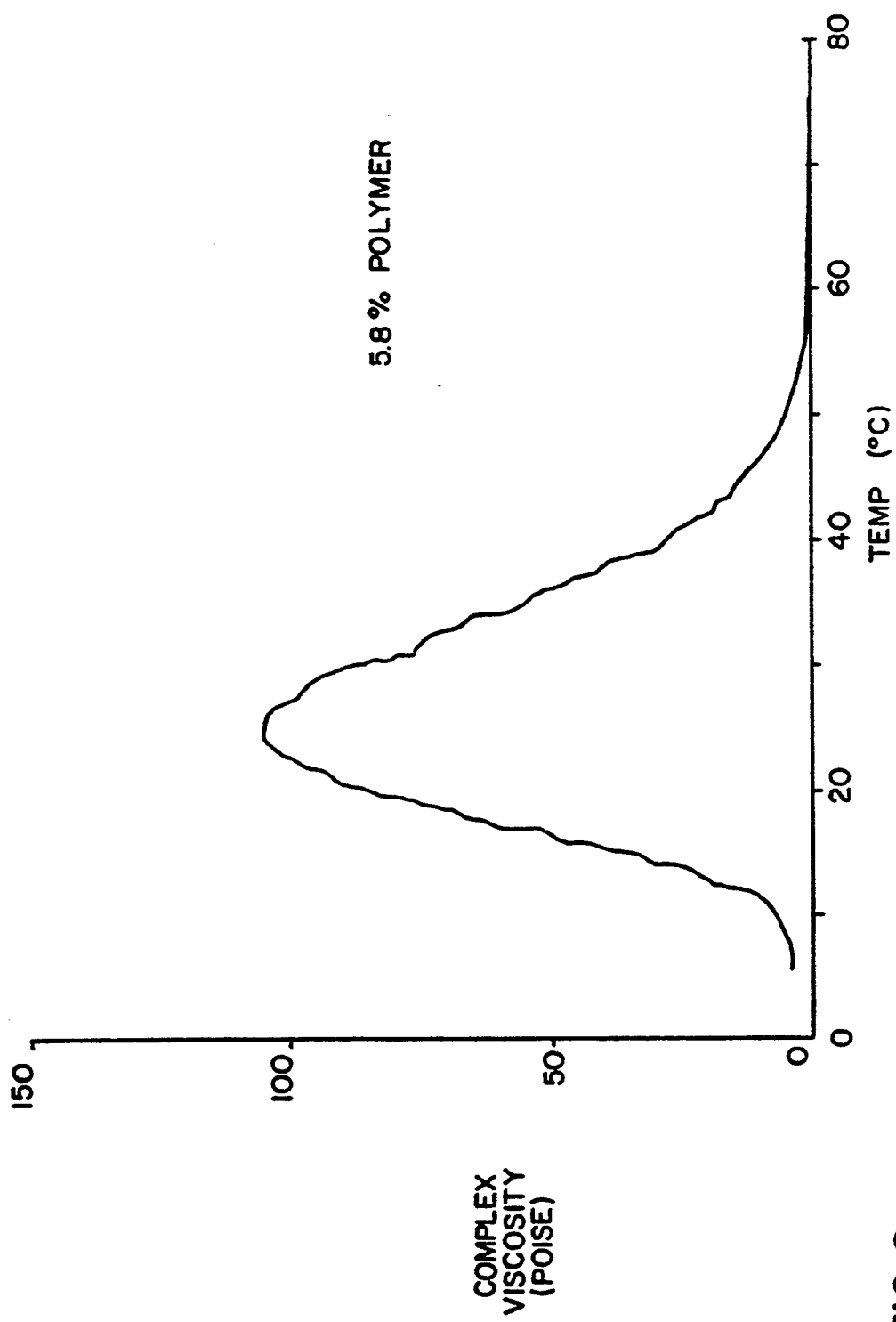

The heating viscosity curve for this sample at 5.8% solids is shown in FIG. 9.

EXAMPLE 6

TBA:A:CEA:APM 65:20:5:10-m

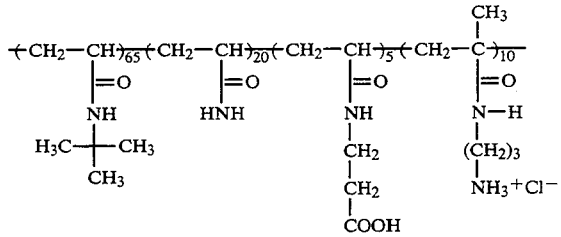

The procedure was identical to the procedure in Example 4. Monomer feed ratios were t-butylacrylamide (82.5 g, 0.65 moles), acrylamide (14.2 g, 0.20 moles), N-carboxyethylacrylamide (7.15 g, 0.05 moles), and N-3-aminopropylmethacrylamide hydrochloride (17.8 g, 0.10 moles). The product solution was clear after 18 hours at 60° C. While warm, it was poured into a 4-liter beaker, diluted with 1 liter water (it became milky white but no particulates could be seen), and was stripped at 70° C. with a nitrogen sweep. The product was a white gel.

| wt. | 979 g 11.5% solids |
| --- | --- |
| iv | 1.05 dL/g (.25% in .1N LiCl/MeOH) |
| wt % CEA | 3.60 |
| wt % APM | 15.6 |
| wt % HCl | 0.15 | theory C 60.59 H 9.41 N 12.64 Cl 2.91 found C 59.14 H 9.80 N 12.45 Cl 3.24

Figure 10:
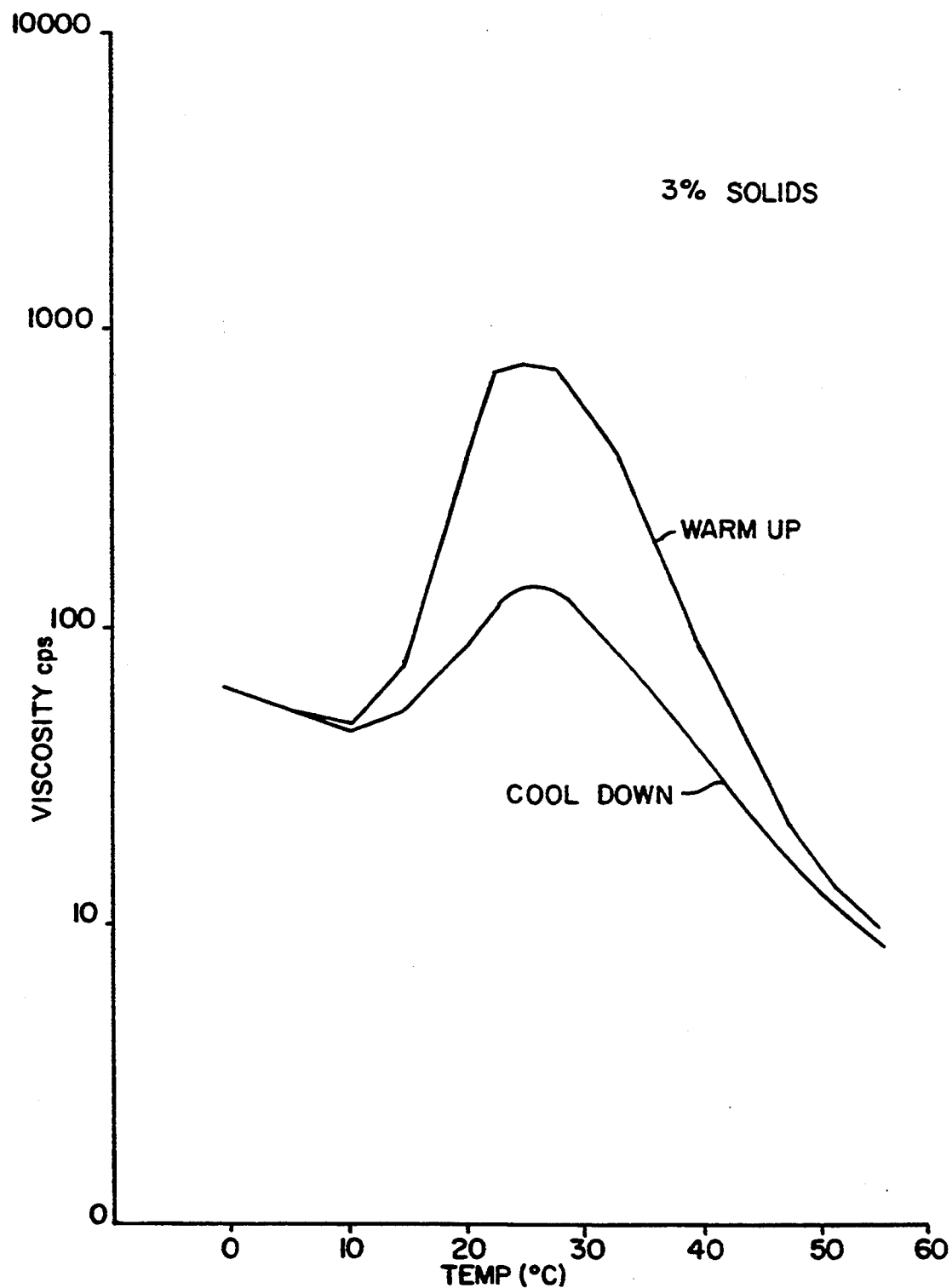

The heating and cooling viscosity curves for this sample at 3.0% solids are shown in FIG. 10.

EXAMPLE 7

TBA:DOA:APM 67.2:16.8:15.9-m

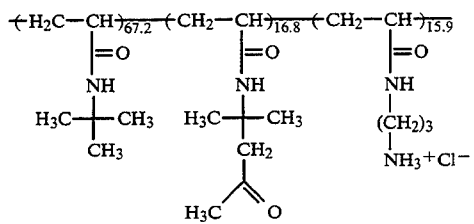

Acetone (250 ml), ethanol (60 ml), water (350 ml), t-butylacrylamide (60 g, 0.47 moles), diacetoneacrylamide (20 g, 0.12 moles), and N-aminopropylmethacrylamide hydrochloride (20 g, 0.11 moles) were combined at 20° C. The mixture was purged with nitrogen for 15 minutes and was then warmed at 60° C. The solution was purged an additional 10 minutes, after which AIBN (1.0 g) in 20 ml acetone was added in one portion. The solution was maintained under positive nitrogen pressure with a slow bleed for the entire reaction time (18 hours). The solution remained clear throughout the reaction time (18 hr). The product was diluted with water (1 liter) and was concentrated in an open beaker at 70°-80° C. using a nitrogen sweep.

| wt. | 885 g, 11.1% |
| --- | --- |
| iv | .71 (dL/g) (.25% in .1N LiCl/MeOH) |
| wt % APM | 18.6 | theory C 62.17 H 9.78 N 11.58 Cl 3.82 found C 59.93 H 9.28 N 11.2 Cl 4.02

Figure 11:
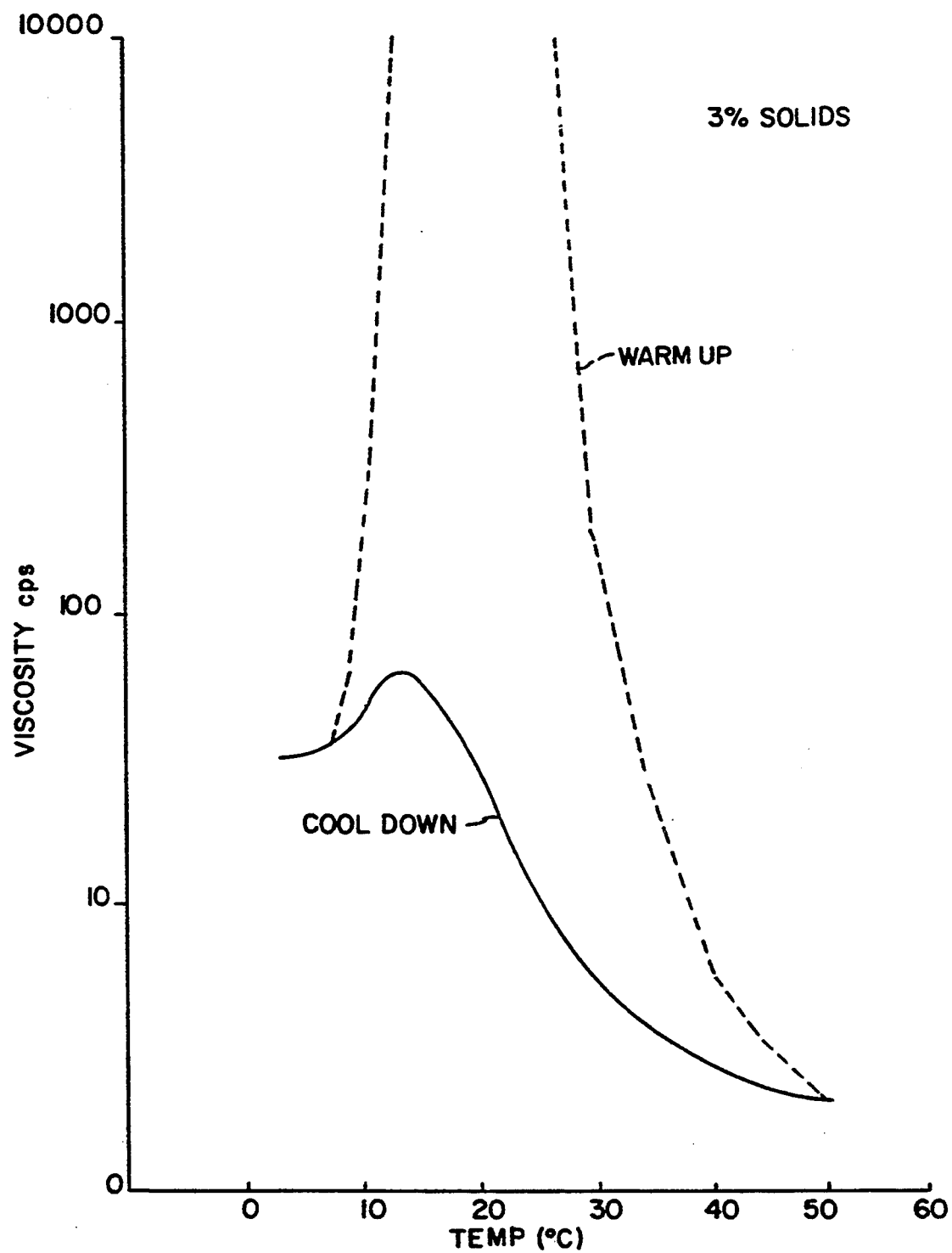

The heating and cooling viscosity curves for this sample at 3.0% solids are shown in FIG. 11.

EXAMPLE 8

SBA:APM 80:20-MOL %

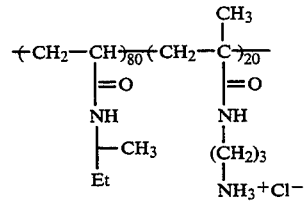

MeOH (50 ml), water (50 ml), N-sec-butylacrylamide (10.17 g, 0.08 moles), N-3-aminopropylmethacrylamide hydrochloride (3.57 g, 0.02 moles) were combined in solvents at 20° C., purged with nitrogen for 15 minutes, and heated to 60° C. (clear, colorless solution). AIBN (0.16 g) in acetone (5 ml) was added in one portion. The reaction was stirred 4 hours at 60° C. with only a slightly hazy appearance in that time. After standing overnight at room temperature, the sample was dialyzed against water (10K cutoff) for 24 hours.

| wt. | 105 g |
| --- | --- |
| % solids | 8.37 |
| iv | .958 dL/g (.25% in .1N LiCl/MeOH) |
| wt % APM | 26.8 |

Theory: C 61.15 Cl 5.16 H 9.82 N 12.23 Found: C 59.79 Cl 5.27 H 9.62 N 11.95

Figure 12:
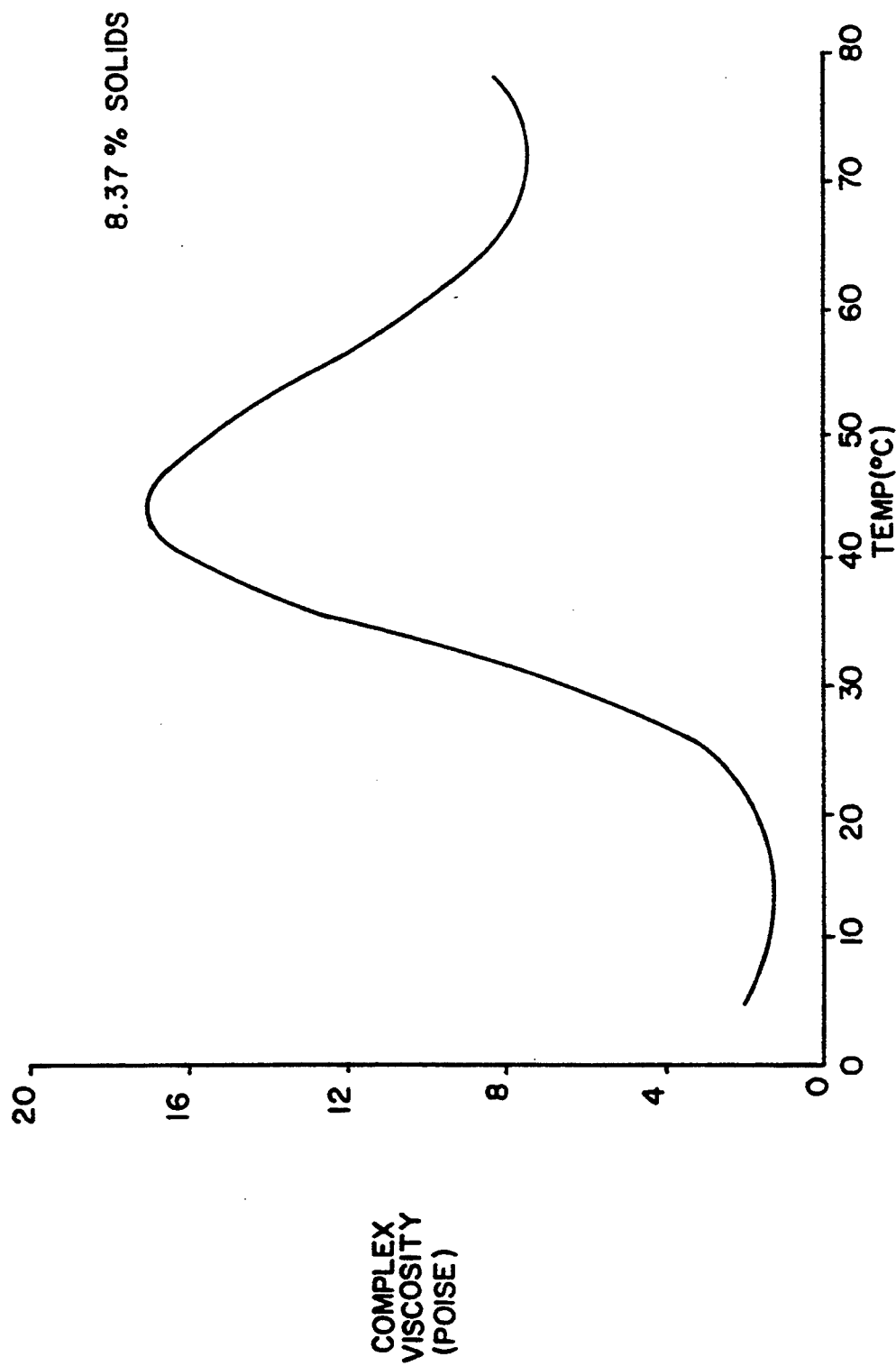

The heating viscosity curve for this sample at 8.37% solids is shown in FIG. 12.

EXAMPLE 9

TPA:APM 80:20-m

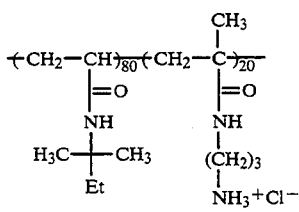

MeOh (100 ml), N-t-Pentylacrylamide (22.6 g, 0.16 moles), N-3-aminopropylmethacrylamide hydrochloride (7.14 g, 0.04 moles) were combined at 20° C. with methanol and purged with nitrogen for 15 minutes. The solution was heated to 60° C. and AIBN (0.32 g) in 5 ml acetone was added in one portion. The reaction was stirred overnight and was dialyzed (10K cutoff) against water for 24 hours. The dialysis bag was allowed to stand 3 days in a hood to allow evaporation of water. Gel formed on the inside of the membrane during that time. The product was heated unsuccessfully at 60° C. to dissolve the gel which now had the consistency of a thick paste. The temperature was increased at 80° C., at which point the paste melted. Most of the gel dissolved at this temperature and the polymer appeared homogeneous although not optically clear (slightly yellow, hazy). The melt was cooled to room temperature and allowed to stand 24 hours. A reversible gel was obtained by cooling the melt to 5° C. The melt appeared indefinitely stable at room temperature.

| wt. | 148 g |
| --- | --- |
| solids | 15.6% |
| iv | .625 dL/g (.1N LiCl/MeOH, .25%) |
| wt % APM | 23.3 |

Theory: C 63.00 Cl 4.77 H 10.17 N 11.30 O 10.76 Found: C 62.49 Cl 4.89 H 10.25 N 11.20

Figure 13:
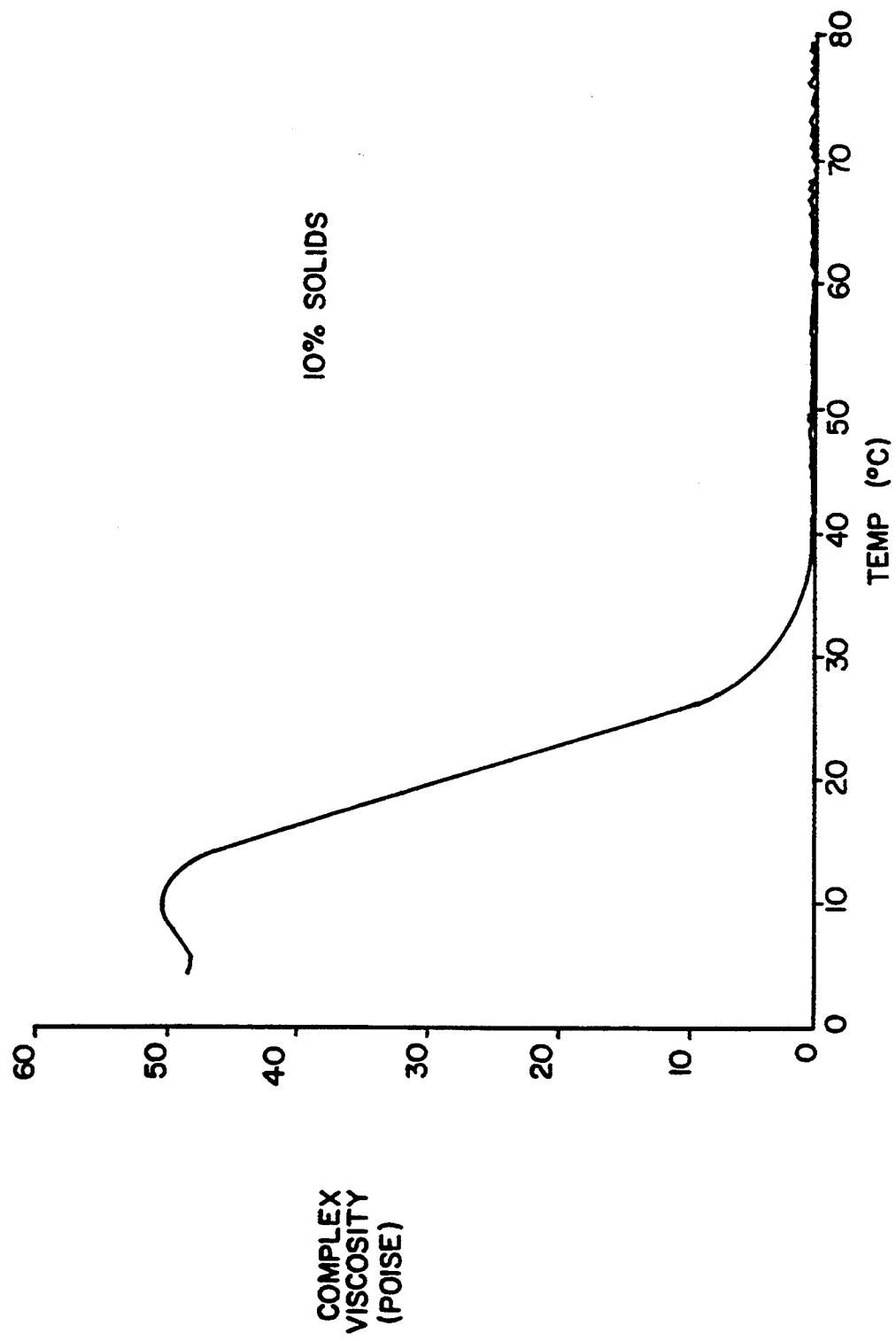

The heating viscosity curve for this sample at 10% solids is shown in FIG. 13.

EXAMPLE 10

This Example serves to demonstrate the advantage of these polymers for coating uniformity when applied in a heat setting operation. A water-soluble polymer of this invention, TBA:APM-80/20, was compared with another water-soluble polymer, A:APM-80/20, which contains the identical ionic monomer (APM) and acrylamide (A) monomer in place of the N-alkyl substituted acrylamide and does not exhibit the heat thickening behavior. The coating solutions were chilled to 10°–15° C. (fluid range for TBA:APM-80/20) and were applied by a coating hopper to a moving polyethylene terephthalate support which immediately entered a drying chamber whose air temperature was 32° C. and relative humidity at 26%, resulting in a web bulb temperature of 19° C. This wet bulb temperature is a reasonable estimate of the actual temperature of the coated solution during the evaporation of the water, and corresponds to the minimum gel temperature of the polymer TBA-:APM-80/20.

Table 2 lists the solutions coated and the uniformity observed. The coating solutions were applied at the wet volume laydowns (cc/ft.$^2$) indicated, and were comprised of water, polymer, and surfactants as spreading agents, at concentrations required to yield the following dry laydowns: 100 mg/ft$^2$ polymer, 3 mg/ft$^2$ surfactant Olin 10G, and 1 mg/ft$^2$ surfactant Zonyl FSN (non-ionic fluorocarbon). The coating uniformity was visualized by dipping the dry coatings into a solution of aniline blue dye which absorbed onto the polymers, followed by washing in distilled water.

The visualizations clearly indicate improved coating uniformity for the gelling polymer, TBA:APM 80/20 over the non-gelling polymer, A:APM 80/20, at volume laydowns over 4cc/ft$^2$. There is also a noticeable reduction in edge bead tendency for the TBA:APM over the A:APM. It should not be inferred from this data that the improvements are limited to the wet laydowns and viscosity range cited (<10 cps) in this example, as the specific conditions depend on the particular coating machine used. The data demonstrate that at any given range of viscosity, wet laydown, and drying rate, the polymers of this invention yield greater flexibility in chosing the specific coating conditions to obtain uniform coatings.

TABLE 2

| Coating Solution | Polymer | Wet Laydown | Coating Defects/ Severity |
|---|---|---|---|
| A | TBA:APM-80/20 | 4 cc/ft$^2$ | None |
| B | TBA:APM-80/20 | 6 cc/ft$^2$ | None |
| C | TBA:APM-80/20 | 8 cc/ft$^2$ | None |
| D | TBA:APM-80/20 | 10 cc/ft$^2$ | None |
| E | TBA:APM-80/20 | 12 cc/ft$^2$ | Blowing/Moderate |
| F | A:APM-80/20 | 4 cc/ft$^2$ | None |
| G | A:APM-80/20 | 6 cc/ft$^2$ | Edge Bead/Moderate |
| H | A:APM-80/20 | 8 cc/ft$^2$ | Blowing/Heavy |
| I | A:APM-80/20 | 10 cc/ft$^2$ | Blowing/Heavy |
| J | A:APM-80/20 | 12 cc/ft$^2$ | Blowing/Heavy |

EXAMPLE 11

ANTIHALATION BACK COAT

Several polymers of this invention were used as binders for photographic antihalation coatings to serve as examples of the utility of such polymers for photographic film back coat applications. Antihalation back coats on transparent supports are well known in the art of photography to serve as absorbers of light that might otherwise be reflected back towards the light sensitive emulsions causing the appearance of halos around bright objects in the developed image. Antihalation layers commonly used in the trade today may employ carbon with a polymeric binder of cellulose acetate hexahydrogen phthalate (hereafter to be referred to as CAP-6) and a wax overcoat to impart greater scratch resistance. The layer is removed from the film after exposure but prior to development of the latent image by first immersing the film in a "pre-bath" of sodium borate and sodium sulfate, followed by water bath and a vigorous spray of water as the film exits the water bath. The final portions of coating are removed by soft mechanical action both prior to development and at the very end of the normal image processing to remove the last traces of polymer-carbon matrix.

The polymers of this invention may offer several features that are desired improvements over the currently used CAP-6 polymeric binder. First, there is the potential for improved coating uniformity. It is desired that the antihalation layer be uniform so as to provide a consistent light absorption element. Second, the ability to be coated from water, as are the invention polymers, afford improved compliance with ever more stringent environmental impact regulations. The CAP-6 polymer suffers in this respect as it must be coated from solvents, such as combinations of alcohols and acetone. Third, it would be advantageous to provide a layer that was easier and simpler to remove and represented a reduced potential for soiling the emulsion side of the coating during the removal process. As presently practiced, the CAP-6 polymer is softened by the borate, but is prevented from spontaneous removal by the high ionic strength provided by the sodium sulfate. If some coating were to be removed in this pre-bath, it could attach itself to the emulsion side and remain there as a black spot, completely ruining the developed image. It would, therefore, be desirous to provide for a stronger coating in the pre-bath, or preferably, eliminate the pre-bath altogether. The polymers of this invention cited here all offer the final advantage of being easily removed by just the action of a strong stream of tap water, followed by a minimal amount of wiping with a soft surface, i.e., sponge. In some cases, no mechanical wiping is required whatsoever when water only is used to remove the coating.

The polymers in this example were all coated at a dry laydown of 50 mg/ft$^2$, 20 or 30 mg/ft$^2$ carbon from commercial aqueous carbon dispersion, "Aqua Black", 3 mg/ft$^2$ Olin 10G, and 1 mg/ft$^2$ Zonyl FSN. The wet laydown was 4 or 5 cc/ft$^2$, and a heat setting mode of machine coating was employed as in the previous example. All the coatings were coated on bare cellulose triacetate support without a subbing layer. For the purpose of this demonstration, a wax overcoat was not placed over this layer as is commonly done in the trade, although such a layer may be employed, as well as lubricants and aqueous wax dispersions coated as an integral part of these layers.

Table 3 lists the observations made during the two separate processes used to evaluate removability of the coatings. Process 1 was designed to approximate the process as it is practiced in the trade. It was executed by immersing the film strips for 15 seconds in a "pre-bath" at 106° F. that consisted of 20 g sodium borate hexahydrate and 100 g sodium sulfate in 1 liter of water, without agitation, followed by 15 seconds in a tap water bath at 106° F., again with no agitation. As the films were withdrawn from the water bath, they were placed under a vigorous stream of tap water at 105° F., followed by gentle wiping to remove the last traces of polymer-carbon matrix. The latter operations represent the water spray and mechanical wiping common to many machine processor. The term "stays on" in the pre-bath means that no coating was removed spontaneously, where "stays on" in the water bath means no coating was seen to come off under the flow of tap water. The term "comes off" in the pre-bath means that even a small portion of the coating was removed (an undesirable trait), and in the water bath it means that some began coming off without agitation, and the remainder came off under the water flow and gentle wiping (a desirable trait). The terms have the same meaning for process 2 (water only) which consisted of 15 seconds immersion followed by the strong water stream and gentle wiping. In both processes, there were instances where the flow of water alone completely cleaned the film, and these cases are indicated with an asterisk.

All of the polymers cited here can be removed with water alone, as opposed to the check, which must be treated in the pre-bath. Polymer C is particularly interesting because it is compatible with both processes, and washes clean without additional wiping. Even the control (J) must be wiped for complete cleanliness in process 1. For initial acceptability in the marketplace, it may be advantageous for the coating to be compatible with either process.

TABLE 3

Removal of Antihalation Back Coat

| Polymer | Process 1 | | Process 2 |
|---------|-----------|-----------|-----------|
|         | Pre-Bath  | Water Wash | Water Only |
| A | Stays on | Comes off | Comes off |
| B | Stays on | Comes off | Comes off |
| C | Stays on | Comes off* | Comes off* |
| D | Stays on | Comes off | Comes off |
| E | Stays on | Comes off | Comes off |
| F | Comes off | — | Comes off* |
| G | Stays on | — | Comes off |
| H | Stays on | — | Comes off* |
| I | Stays on | Stays on | Comes off |
| J | Stays on | Comes off | Stays on |

*Indicates complete cleaning by water flow only
A = TBA:SSA-70:30
B = TBA:SSA-80:20
C = TBA:SSA-90:10
D = TBA:IPA:SSA-70:20:10
E = TBA:IPA:SSA-45:45:10
F = TBA:CDAS-60:40 (CDAS = 2-carboxy-1,1-dimethyl-ethyl-acrylamide, sodium salt)
G = TBA:CDAS-70:30
H = TBAA:APM-65:15:20
I = TBA:APM-80:20
J = CAP-6 (control)

The invention has been described in detail with particular reference to preferred embodiments thereof, but it will be understood that variations and modifications can be effected within the spirit and scope of the invention.

We claim:
1. A method of casting a layer comprising providing a solution comprising water and a polymer represented by the general Formula 1:

$$-(A)_{x'}-(B)_{y'}- \qquad (1)$$

wherein A and B are randomly distributed in the polymer chain and wherein A represents recurring hydrophobic units, and B represents recurring hydrophilic units "wherein x' is 40 to 99.9 mole %, y' is 60 to 0.1 mole %". casting a layer of said solution, and heating to thicken and gel said layer with the proviso that said hydrophobic units are selected from at least one member of the group consisting of

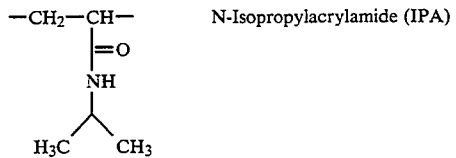 N-Isopropylacrylamide (IPA)

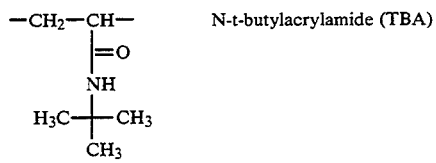 N-t-butylacrylamide (TBA)

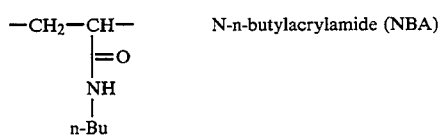 N-n-butylacrylamide (NBA)

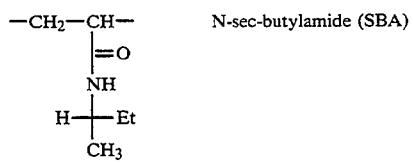 N-sec-butylamide (SBA)

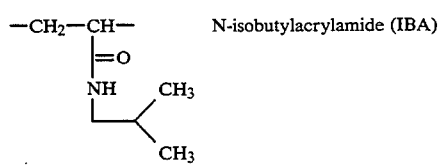 N-isobutylacrylamide (IBA)

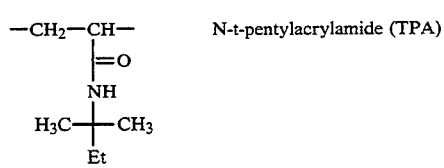 N-t-pentylacrylamide (TPA)

and

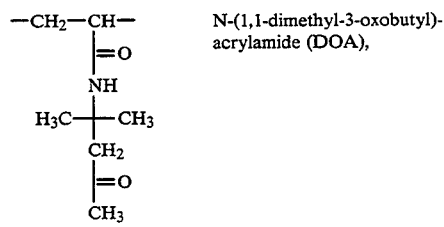 N-(1,1-dimethyl-3-oxobutyl)-acrylamide (DOA), and said hydrophilic units are selected from at least one member of the group consisting of

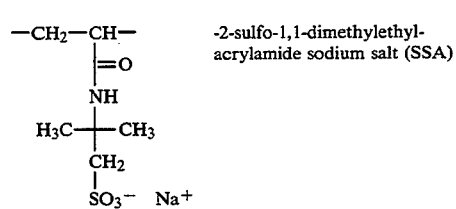 -2-sulfo-1,1-dimethylethyl-acrylamide sodium salt (SSA)

-continued

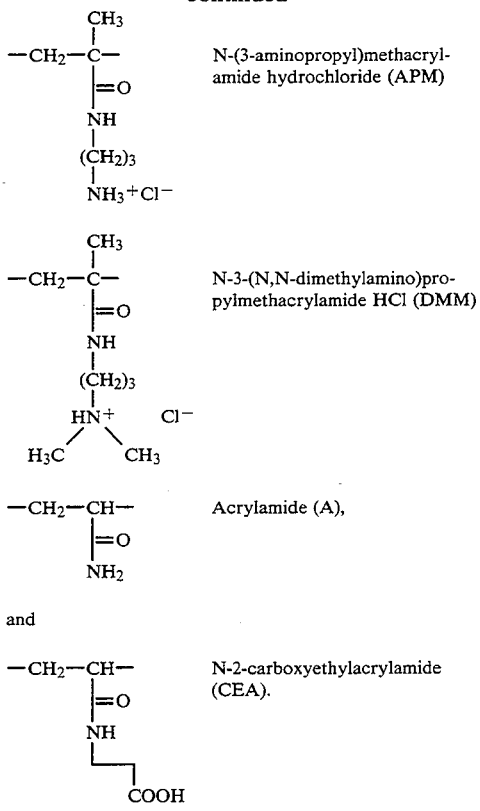

2. The method of claim 1 wherein said solution further comprises at least one of acetone, methanol, ethanol, tetrahydrofuran, and isopropanol.

3. The method of claim 1 wherein said layer comprises a layer of a photographic film.

4. The method of claim 3 wherein said layer comprises the antihalation layer.

5. The method of claim 1 wherein said solution has a viscosity of less than 10 cps.

6. The method of claim 1 wherein said layer is dried after said heating to thicken.

7. The method of claim 1 wherein said polymer comprises

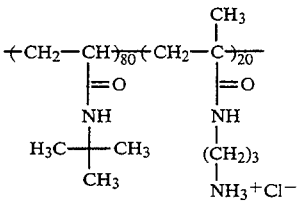

8. The method of claim 1 wherein said solution is cooled to below the gel region prior to coating and then said heating after coating is to the gel point of said solution.

9. The method of claim 1 wherein in said polymer the hydrophobic unit comprises at least about 30 mole percent of said polymer.

10. The method of claim 1 wherein said polymer comprises

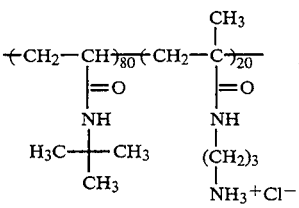

11. The method of claim 1 wherein after said heating, the layer is dried by removal of the aqueous solvent.

12. The method of claim 1 wherein after gelling, said layer is dried to remove said aqueous solvent.

* * * * *